US012034232B2

(12) United States Patent
Komura et al.

(10) Patent No.: US 12,034,232 B2
(45) Date of Patent: Jul. 9, 2024

(54) ANTENNA MODULE, COMMUNICATION MODULE, AND COMMUNICATION DEVICE

(71) Applicant: Murata Manufacturing Co., Ltd., Kyoto (JP)

(72) Inventors: Ryo Komura, Kyoto (JP); Yoshiki Yamada, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 557 days.

(21) Appl. No.: 17/234,988

(22) Filed: Apr. 20, 2021

(65) Prior Publication Data

US 2021/0242596 A1 Aug. 5, 2021

Related U.S. Application Data

(63) Continuation of application No. PCT/JP2019/036312, filed on Sep. 17, 2019.

(30) Foreign Application Priority Data

Nov. 15, 2018 (JP) ................................ 2018-214887

(51) Int. Cl.
*H01Q 9/04* (2006.01)
*H01Q 1/24* (2006.01)
*H01Q 1/52* (2006.01)

(52) U.S. Cl.
CPC ........... *H01Q 9/0421* (2013.01); *H01Q 1/243* (2013.01); *H01Q 1/52* (2013.01)

(58) Field of Classification Search
CPC ............ H01Q 1/243; H01Q 1/38; H01Q 1/52; H01Q 21/0025; H01Q 21/065; H01Q 23/00; H01Q 9/0421
See application file for complete search history.

(56) References Cited

U.S. PATENT DOCUMENTS 5,175,522 A * 12/1992 Clark ........................ H01P 1/04 333/260
7,368,918 B2 * 5/2008 Henson ................ H02H 1/0015 324/536

(Continued)

FOREIGN PATENT DOCUMENTS

CN 107078405 A 8/2017
JP 2004072731 A 3/2004

(Continued)

OTHER PUBLICATIONS

International Search Report issued in Application No. PCT/JP2019/036312, dated Nov. 12, 2019.

(Continued)

*Primary Examiner* — Thien M Le
(74) *Attorney, Agent, or Firm* — Pearne & Gordon LLP

(57) ABSTRACT

An antenna module includes a dielectric substrate, a radiation electrode, a ground electrode, and a current-interrupting element. The radiation electrode is disposed in a layer of the dielectric substrate, and the ground electrode is disposed in another layer of the dielectric substrate. The current-interrupting element is electrically connected to the ground electrode. The current-interrupting element is configured to interrupt a current flowing through the ground electrode. The current-interrupting element has a first edge portion electrically connected to the ground electrode and a second edge portion left open and includes a planar electrode parallel to the ground electrode. The dimension of the current-interrupting element in the direction from the first edge portion to the second edge portion is about λ/4, where λ is the wavelength of a radio-frequency signal radiated from the radiation electrode.

12 Claims, 21 Drawing Sheets

(56) References Cited

U.S. PATENT DOCUMENTS

| | | | | |
|---|---|---|---|---|
| 2004/0061652 | A1* | 4/2004 | Ishihara | H01Q 9/36<br>343/700 MS |
| 2008/0198085 | A1* | 8/2008 | Hsu | H01Q 21/08<br>343/795 |
| 2009/0073072 | A1* | 3/2009 | Lindenmeier | H01Q 25/00<br>343/866 |
| 2015/0288137 | A1* | 10/2015 | Lee | H01S 5/06256<br>372/28 |
| 2016/0013447 | A1* | 1/2016 | Wehlus | H10K 50/854<br>257/40 |
| 2017/0222316 | A1 | 8/2017 | Mizunuma et al. | |
| 2019/0051977 | A1* | 2/2019 | Kawaguchi | H01Q 13/08 |
| 2021/0005955 | A1* | 1/2021 | Sudo | H01Q 1/523 |
| 2021/0242596 | A1* | 8/2021 | Komura | H01Q 9/0421 |
| 2021/0242602 | A1* | 8/2021 | Nishida | H01Q 1/528 |

FOREIGN PATENT DOCUMENTS

| | | | |
|---|---|---|---|
| JP | 2007267041 | A | 10/2007 |
| JP | 2008219574 | A | 9/2008 |
| JP | 2017191961 | A | 10/2017 |

OTHER PUBLICATIONS

Written Opinion issued in Application No. PCT/JP2019/036312, dated Nov. 12, 2019.

* cited by examiner

| | |
|---|---|
| ISOLATION CHARACTERISTICS (BETWEEN P1 AND P3) |   |
| PEAK GAIN (NO TILT) |   |
| PEAK GAIN (TILT OF -30°) |   |

ANTENNA MODULE, COMMUNICATION MODULE, AND COMMUNICATION DEVICE

CROSS REFERENCE TO RELATED APPLICATION

This is a continuation of International Application No. PCT/JP2019/036312 filed on Sep. 17, 2019 which claims priority from Japanese Patent Application No. JP 2018-214887 filed on Nov. 15, 2018. The contents of these applications are incorporated herein by reference in their entireties.

BACKGROUND OF THE DISCLOSURE

Field of the Disclosure

The present disclosure relates to an antenna module, a communication module including the antenna module, and a communication device including the antenna module and, more specifically, to a technique for adjusting the directivity of the antenna module.

Description of the Related Art

A patch antenna in which a planar antenna element (radiation electrode) is incorporated is known. The need for adjusting the direction in which radio waves are radiated (the directivity of the patch antenna) may arise when the patch antenna is put to particular uses.

Japanese Unexamined Patent Application Publication No. 2017-191961 (Patent Document 1) discloses a stacked patch antenna that is to be included in a radar system. The patch antenna includes a driven element and a parasitic element disposed above the driven element. The parasitic element is disposed in a manner so as not to lie immediately above the driven element. Owing to this configuration, the directivity of the patch antenna is adjusted in such a manner that radio waves radiated by the patch antenna form an asymmetrical pattern on the E-plane (electric field plane).

Patent Document 1: Japanese Unexamined Patent Application Publication No. 2017-191961

BRIEF SUMMARY OF THE DISCLOSURE

Such a patch antenna may be included in a mobile terminal such as a mobile phone or a smartphone. It is therefore necessary to reduce the size of the antenna module so as to address the demands for smaller and thinner apparatuses.

The configuration disclosed in Patent Document 1 requires that a stacked parasitic element be provided specifically for adjustment of directivity. Thus, the configuration in Patent Document 1, which may be adopted into a small apparatus such as a mobile terminal for the purpose of adjusting the directivity, could be a hindrance to reducing the size of the antenna module.

The present disclosure therefore has been made to solve the above-mentioned problem, and it is an object of the present disclosure to adjust the directivity of the radio waves radiated from an antenna module including a planar radiation electrode, without necessitating an additional radiation electrode.

An antenna module disclosed herein includes a dielectric substrate, a radiation electrode, a ground electrode, and at least one current-interrupting element. The dielectric substrate has a multilayer structure. The radiation electrode is disposed in a layer of the dielectric substrate to radiate a radio-frequency signal. The ground electrode is disposed in another layer of the dielectric substrate. The at least one current-interrupting element is electrically connected to the ground electrode and is configured to interrupt a current flowing through the ground electrode. The at least one current-interrupting element includes a planar electrode that is parallel to the ground electrode and that has a first edge portion electrically connected to the ground electrode and a second edge portion left open. The dimension of the at least one current-interrupting element in the direction from the first edge portion to the second edge portion is about λ/4, where λ is a wavelength of a radio-frequency signal radiated from the radiation electrode.

According to the present disclosure, the ground electrode of the antenna module is provided with the current-interrupting element configured to interrupt the current flowing through the ground electrode. This configuration enables adjustment of the current flowing through the ground electrode and thus enables adjustment of the directivity of the antenna module without necessitating an additional radiation electrode.

DETAILED DESCRIPTION OF THE DISCLOSURE

Figure 1:
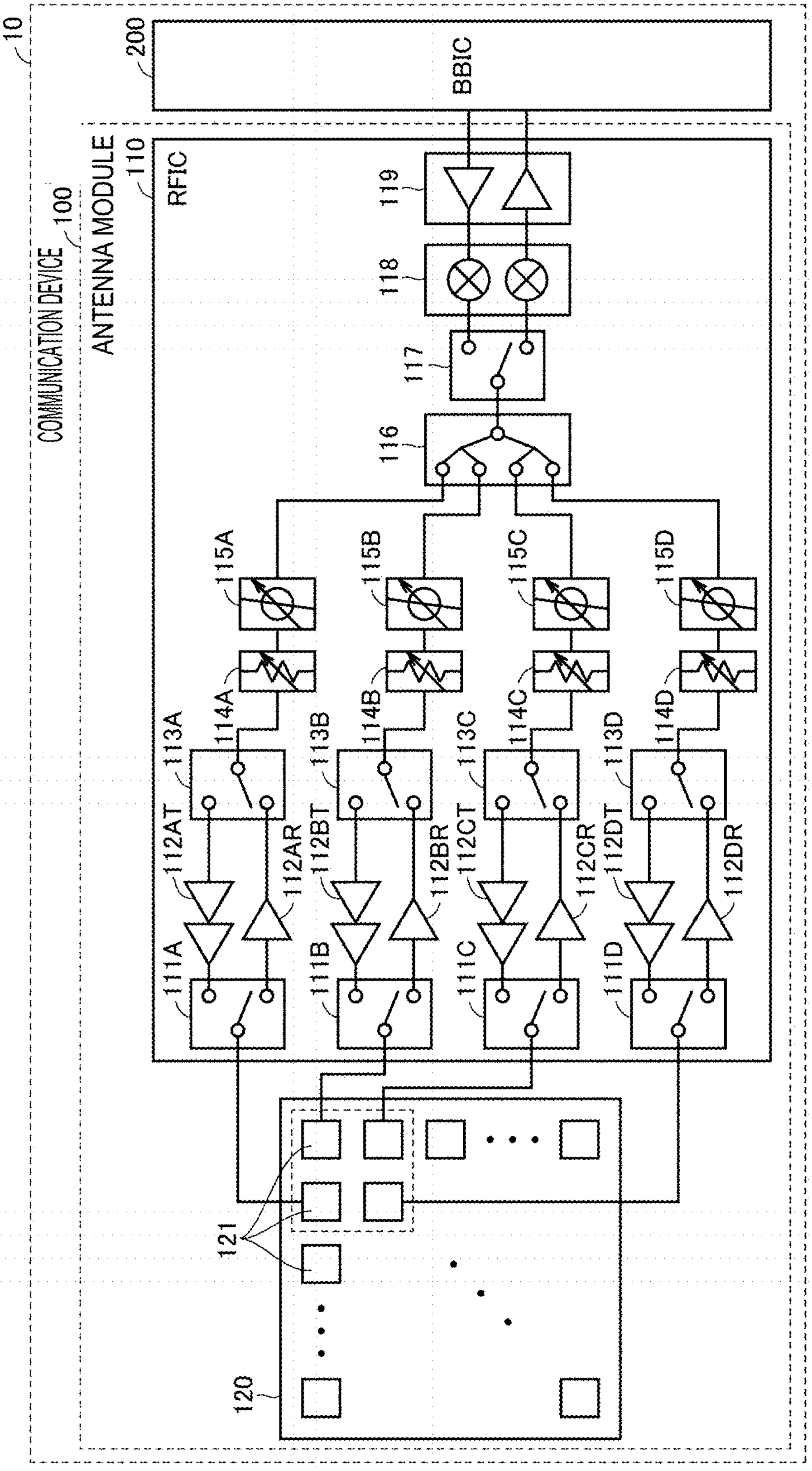
FIG. 1 is a block diagram of a communication device into which an antenna module according to Embodiment 1 is adopted.

Embodiments of the present disclosure will be described below in detail with reference to the drawings. Note that the same or like parts in the drawings are denoted by the same reference signs throughout and redundant description thereof will be omitted.

Embodiment 1

(Basic Configuration of Communication Device)

FIG. 1 is a block diagram of a communication device 10, into which an antenna module 100 according to Embodiment 1 is adopted. The communication device 10 may, for example, be a mobile terminal such as a mobile phone, a smart phone, or a tablet, or may be a personal computer with communications capabilities. The antenna module 100 according to the present embodiment may, for example, be used for radio waves in millimeter-wave bands with center frequencies of 28 GHz, 39 GHz, and 60 GHz and may also be used for radio waves in other frequency bands.

Referring to FIG. 1, the communication device 10 includes the antenna module 100 and a BBIC 200, which is a baseband signal processing circuit. The antenna module 100 includes an RFIC 110 and an antenna unit 120. The RFIC 110 is an example of a feeder circuit. The communication device 10 up-converts signals transmitted from the BBIC 200 to the antenna module 100 and radiates the resultant radio-frequency signals through the antenna unit 120. The communication device 10 down-converts the radio-frequency signals received through the antenna unit 120, and the resultant signals are processed in the BBIC 200.

The antenna unit 120 includes antenna elements (radiation electrodes) 121. The configurations corresponding to only four of the antenna elements 121 are illustrated in FIG. 1, from which the other antenna elements 121 with similar configurations are omitted for easy-to-understand illustration. The antenna unit 120 in FIG. 1 includes a two-dimensional array of antenna elements 121. Alternatively, the antenna unit 120 may include one antenna element 121. Still alternatively, the antenna unit 120 may include a linear array of antenna elements 121. Each of the antenna elements 121 in the present embodiment is a patch antenna in the form of a flat plate that is substantially square in shape.

The RFIC 110 includes switches 111A to 111D, switches 113A to 113D, a switch 117, power amplifiers 112AT to 112DT, low-noise amplifiers 112AR to 112DR, attenuators 114A to 114D, phase shifters 115A to 115D, a signal combiner/splitter 116, a mixer 118, and an amplifier circuit 119.

Transmission of radio-frequency signals is accomplished by switching the switches 111A to 111D and the switches 113A to 113D to their respective positions for connections with the power amplifiers 112AT to 112DT and by connecting the switch 117 to a transmitting amplifier included in the amplifier circuit 119. Reception of radio-frequency signals is accomplished by switching the switches 111A to 111D and the switches 113A to 113D to their respective positions for connections with the low-noise amplifiers 112AR to 112DR and by connecting the switch 117 to a receiving amplifier included in the amplifier circuit 119.

Signals transmitted from the BBIC 200 are amplified in the amplifier circuit 119 and are then up-converted in the mixer 118. Transmission signals, namely, up-converted radio-frequency signals are each split into four waves by the signal combiner/splitter 116. The four waves flow through four respective transmission paths and are fed to different antenna elements 121. The phase shifters 115A to 115D disposed on the respective signal paths provide individually adjusted degrees of phase shift, and the directivity of the antenna unit 120 is adjusted accordingly.

Reception signals, namely, radio-frequency signal received by the antenna elements 121 pass through four different signal paths and are combined by the signal combiner/splitter 116. The combined reception signals are down-converted in the mixer 118, are amplified in the amplifier circuit 119, and are then transmitted to the BBIC 200.

The RFIC 110 is configured as, for example, a one-chip integrated circuit component having the aforementioned circuit configuration. Alternatively, the RFIC 110 may include one-chip integrated circuit components, each of which is provided for the corresponding one of the antenna elements 121 and is constructed of switches, a power amplifier, a low-noise amplifier, an attenuator, and a phase shifter.

(Configuration of Antenna Module)

Figure 2:
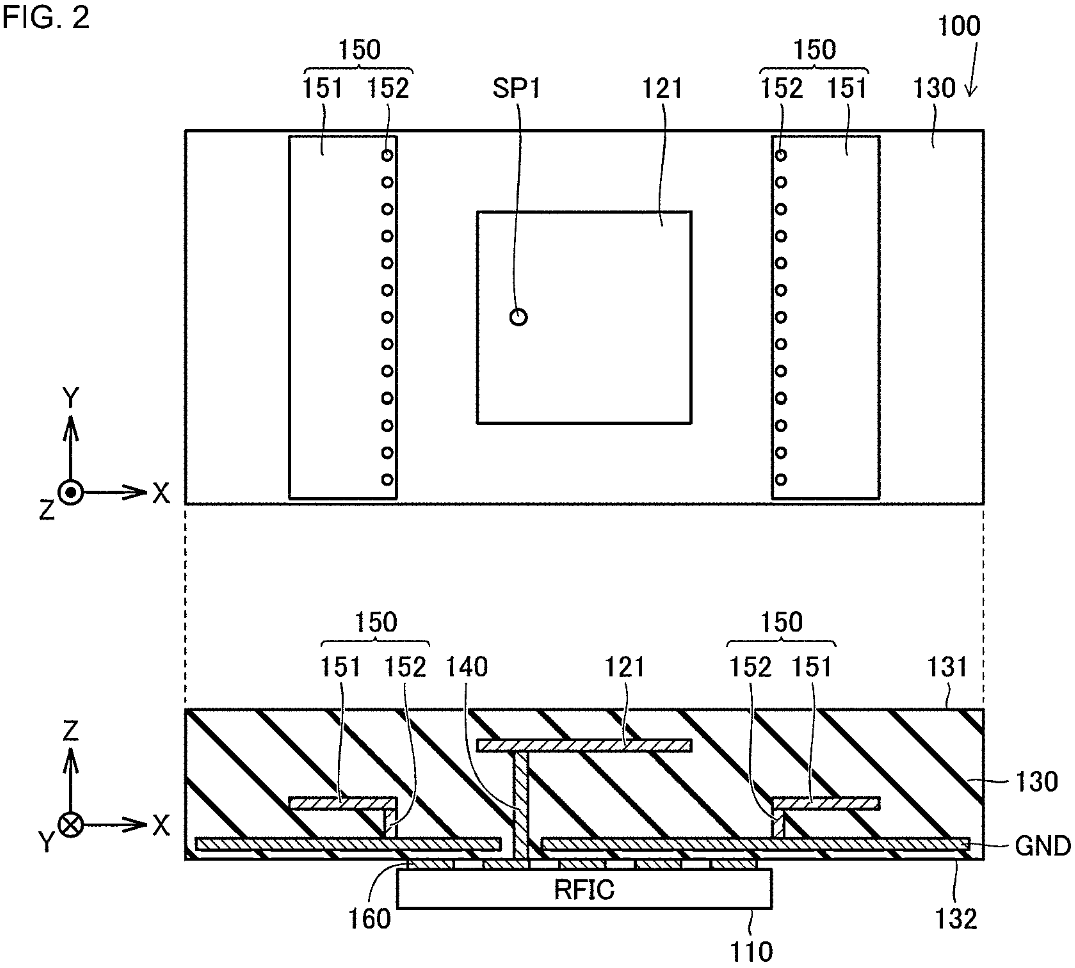
FIG. 2 includes a plan view and a sectional view for the detailed explanation of the antenna module illustrated in FIG. 1.

FIG. 2 is for the detailed explanation of the configuration of the antenna module 100 according to Embodiment 1. The upper section of FIG. 2 is a plan view, and the lower section of FIG. 2 is a sectional view taken along a line passing through a feed point SP1. The antenna module 100 includes a dielectric substrate 130, which is illustrated only partly in the plan view in the upper section of FIG. 2 for the sake of greater clarity of the internal configuration.

Referring to FIG. 2, the antenna module 100 includes, in addition to the antenna elements 121 and the RFIC 110, the dielectric substrate 130, a feed line 140, current-interrupting elements 150, and a ground electrode GND. The positive side and the negative side in the Z-axis direction in each drawing may be hereinafter referred to as an upper surface side and a lower surface side, respectively.

Substrates that may be used as the dielectric substrate 130 include: a low-temperature co-fired ceramic (LTCC) multilayer substrate; a multilayer resin substrate including epoxy layers, polyimide layers, or other resin layers stacked on top of one another; a multilayer resin substrate including resin layers made from liquid crystal polymer (LCP) of lower dielectric constant and stacked on top of one another; a multilayer resin substrate including fluororesin layers stacked on top of one another; and ceramic multilayer substrates other than the LTCC multilayer substrates.

The dielectric substrate 130 is rectangular in shape when viewed in plan. The antenna element 121, which is substantially square in shape, is disposed in an inner layer of the dielectric substrate 130 or on a top surface 131 on the upper side (i.e., in an upper surface layer). The ground electrode GND in the dielectric substrate 130 is disposed in a layer closer to the lower side than a layer in which the antenna element 121 is disposed. The RFIC 110 faces a bottom surface 132 on the lower side of the dielectric substrate 130 with a solder bump 160 being disposed between the RFIC 110 and the bottom surface 132.

Radio-frequency signals from the RFIC 110 flow through the feed line 140 extending through the ground electrode GND and are transmitted to the feed point SP1 of the antenna element 121. The feed point SP1 of the antenna element 121 is off-center, or more specifically, is shifted out of the center (intersection of diagonal lines) of the antenna element 121 to the negative side in the X-axis direction in FIG. 2. Radio-frequency signals fed into the feed point SP1 cause the antenna element 121 to radiate the radio waves polarized in the X-axis direction.

The current-interrupting elements 150 are discretely located away from the antenna element 121 in the X-axis direction and extend in a direction crossing the polarization direction. More specifically, the current-interrupting elements 150 lie in an X-Y plane of the dielectric substrate 130 and extend in the direction (Y-axis direction) orthogonal to the polarization direction (X-axis direction). In the example illustrated in FIG. 2, two current-interrupting elements 150, respectively, are disposed on the positive side and the negative side in the X-axis direction in a manner so as to be discretely located away from the antenna element 121.

The current-interrupting elements 150 each include a planar electrode 151 and vias 152. The planar electrode 151 is parallel to the ground electrode GND and is rectangular in shape. Each of the current-interrupting elements 150, or more specifically, one of the long sides (first edge portion) of each of the planar electrodes 151 is connected to the ground electrode GND through the vias 152. The other long side (second edge portion) of each of the planar electrodes 151 is left open. The current-interrupting elements 150 are substantially L-shaped when viewed in section along a plane lying parallel to the X axis and passing through one of the vias 152 as illustrated in FIG. 2. In the example illustrated in FIG. 2, the current-interrupting elements 150 are disposed in such a manner that their respective first edge portions face the antenna element 121.

Figure 3:
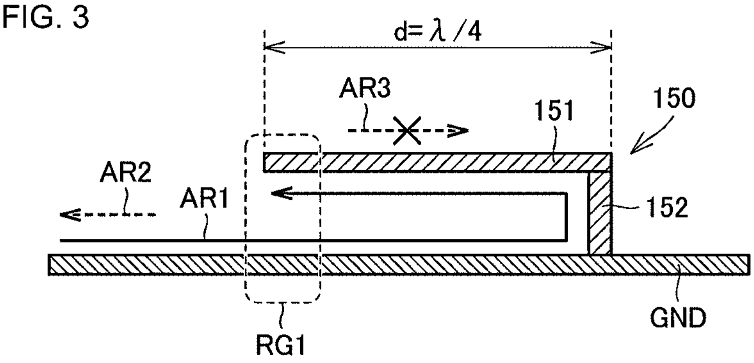
FIG. 3 is provided for the explanation of the principle of how a current is interrupted by a current-interrupting element illustrated in FIG. 2.

As illustrated in FIG. 3, the dimension of the planar electrode 151 in the X-axis direction is about $\lambda/4$; that is, each of the short sides of the planar electrode 151 is about $\lambda/4$, where $\lambda$ is the wavelength of the radio waves radiated from the antenna element 121. The expression "about $\lambda/4$" herein implies that the dimension is $\lambda/4$ with a tolerance of ±10%.

The planar electrode 151 is longer in the Y-axis direction (i.e., each of the long sides of the planar electrode 151 is longer) than a side of the antenna element 121 facing one of the long sides of the planar electrode 151. The antenna element 121 is typically designed as a square with each side being half the wavelength ($\lambda/2$) of the radio waves radiated from the antenna element 121. Thus, the length of each of the long sides of the planar electrode 151 is preferably greater than $\lambda/2$.

The current-interrupting elements 150 are configured to interrupt the current flowing through the ground electrode GND, as will be described below. The electromagnetic field distribution between the antenna element 121 and the ground electrode GND is a determinant of the antenna characteristics, which may thus be adjusted by changing the distribution of the current flowing through the ground electrode GND.

Conductors that are formed into, for example, the antenna element, the electrodes, and the vias illustrated in FIG. 2 are made of aluminum (Al), copper (Cu), gold (Au), silver (Ag), or an alloy containing these metals as a principal component.

FIG. 3 is provided for the explanation of the principle of how the current flowing through the ground electrode GND is interrupted by the current-interrupting element 150. The following description will be given on the assumption that a current flows through the ground electrode GND in the direction from left to right on the drawing plane as denoted by an arrow AR1 in FIG. 3. The current reaches the current-interrupting element 150 and then partially flows into the planar electrode 151 through the vias 152. The current flowing through the planar electrode 151 under resonance conditions is in the opposite phase when d is equal to $\lambda/4$, where d denotes the dimension of the planar electrode 151 in the direction from the first edge portion to the second edge portion. Consequently, the current flowing through the planar electrode 151 cancels out the current flowing through the ground electrode GND in a region including the open edge (second edge portion) of the planar electrode 151 (i.e., in a region RG1 in FIG. 3). As a result, the reflected current flows in the direction denoted by an arrow AR2, whereas the current flowing in the direction denoted by an arrow AR3 is interrupted. Similarly, the current (not illustrated in FIG. 3) flowing through the ground electrode GND in the direction from right to left on the drawing plane is interrupted by the current-interrupting element 150. In this way, the current-interrupting element 150 provided to the ground electrode GND enables adjustment of the current distribution in the ground electrode GND.

Referring to FIG. 3, the dimension of the planar electrode 151 of the current-interrupting element 150 in the direction from the first edge portion to the second edge portion is $\lambda/4$.

Figure 4:
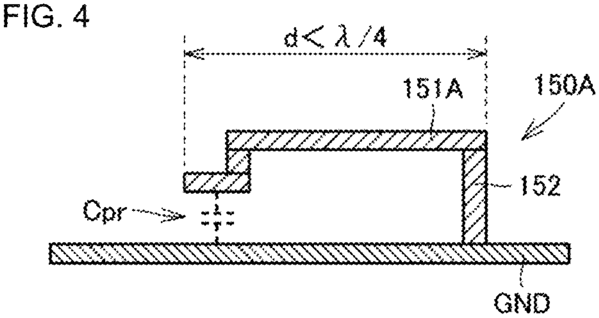
FIG. 4 illustrates another example of the current-interrupting element.

Alternatively, the dimension of the planar electrode 151 in the direction from the first edge portion to the second edge portion may be less than λ/4 when the planar electrode 151 in FIG. 3 is modified as in FIG. 4 illustrating a current-interrupting element 150A, which includes a planar electrode 151A having an open edge portion that is close to the ground electrode GND. The reason why this configuration is practicable is that the increased proximity of the open edge portion to the ground electrode GND leads to an increase in parasitic capacitance Cpr with the corresponding changes in the resonant frequency of the current-interrupting element 150A. In the case in which the degree of flexibility in the placement of the current-interrupting elements is limited, the adoption of the configuration in FIG. 4 is conducive to a reduction in the size of the antenna module.

With reference to FIGS. 5 to 8, the following describes the effects exerted on the antenna characteristics by the current-interrupting elements.

Figure 5A:
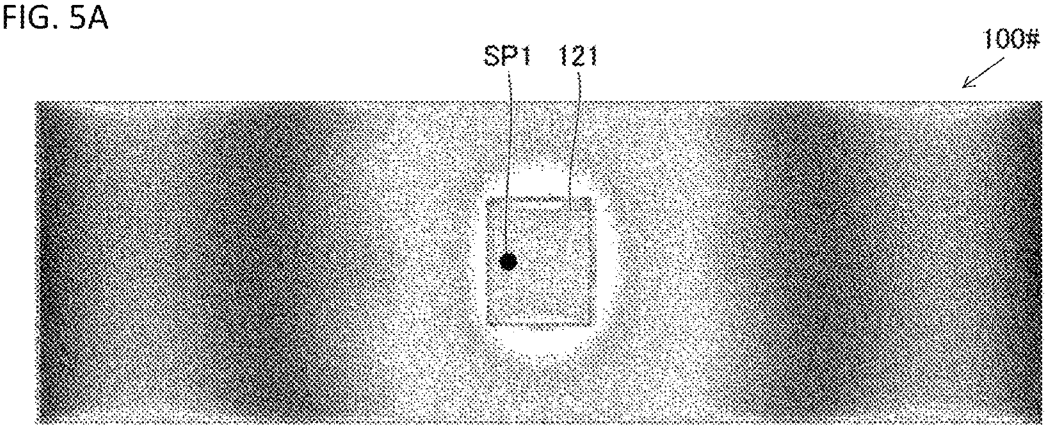
FIGS. 5A and 5B illustrate the current distribution in a ground electrode provided with current-interrupting elements extending in a direction orthogonal to a polarization direction and the current distribution in a ground electrode in a comparative example in which the current-interrupting elements are not provided.
Figure 5B:
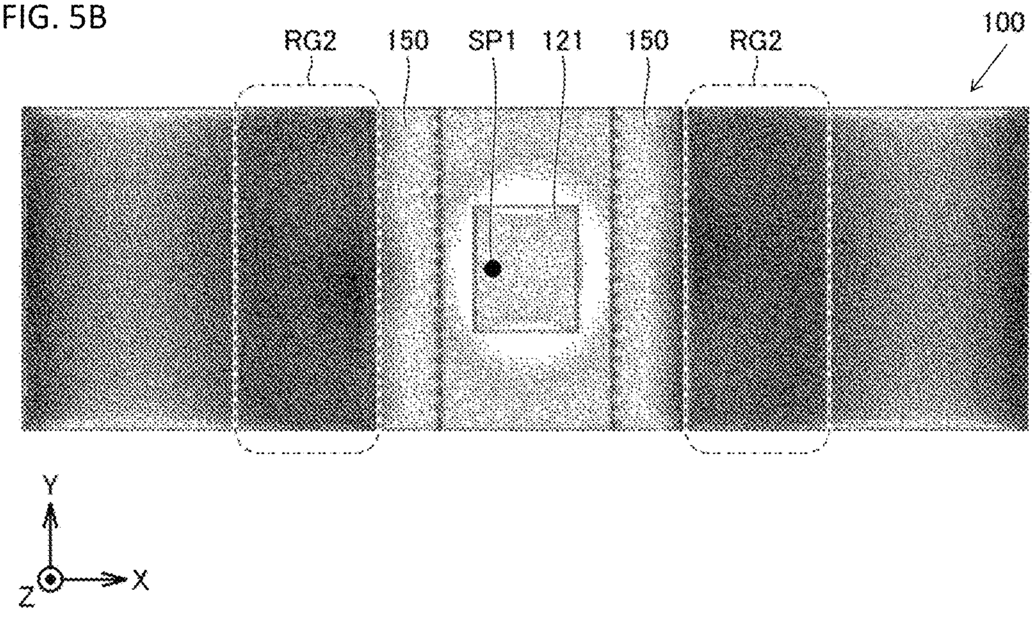

FIGS. 5A and 5B illustrate the current distribution in the ground electrode GND of the antenna module 100 (see FIG. 5B) according to Embodiment 1 in FIG. 2 and the current distribution in the ground electrode GND of an antenna module 100# (see FIG. 5A) according to a comparative example in which the current-interrupting elements 150 are not provided. Darker regions in FIGS. 5A and 5B, and in FIGS. 7A and 7B, which will be discussed later, imply that the current intensity is lower.

As illustrated in FIGS. 5A and 5B, the current distribution in the ground electrode GND of the antenna module 100# according to the comparative example and the current distribution in the ground electrode GND of the antenna module 100 according to Embodiment 1 are different from each other. More specifically, the contrast between the high current intensity and the low current intensity is sharper in the antenna module 100 according to Embodiment 1 than in the antenna module 100# according to the comparative example. The current intensity is higher in a region inside the current-interrupting elements 150 (i.e., a region closer to the antenna element 121) and is lower in regions RG2 (see FIG. 5B) outside the current-interrupting elements 150 from the antenna element 121.

Figure 6A:
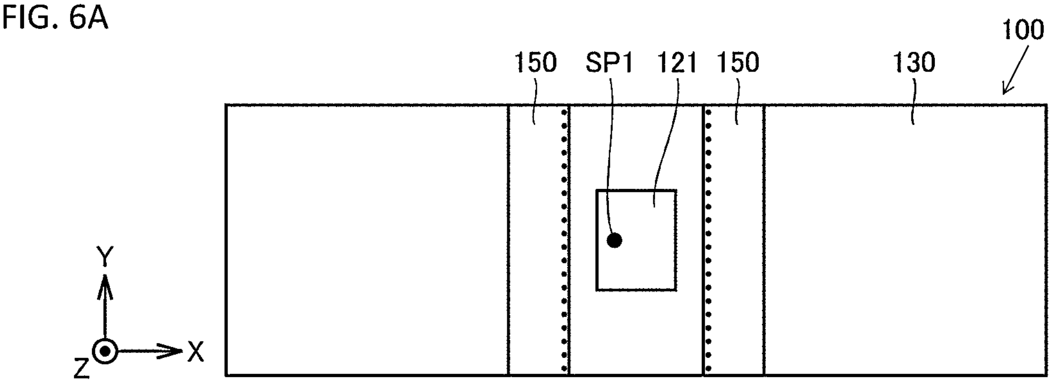
FIGS. 6A and 6B are provided for the explanations of the gain in Embodiment 1 illustrated in FIG. 5B and the gain in the comparative example illustrated in FIG. 5A.
Figure 6B:
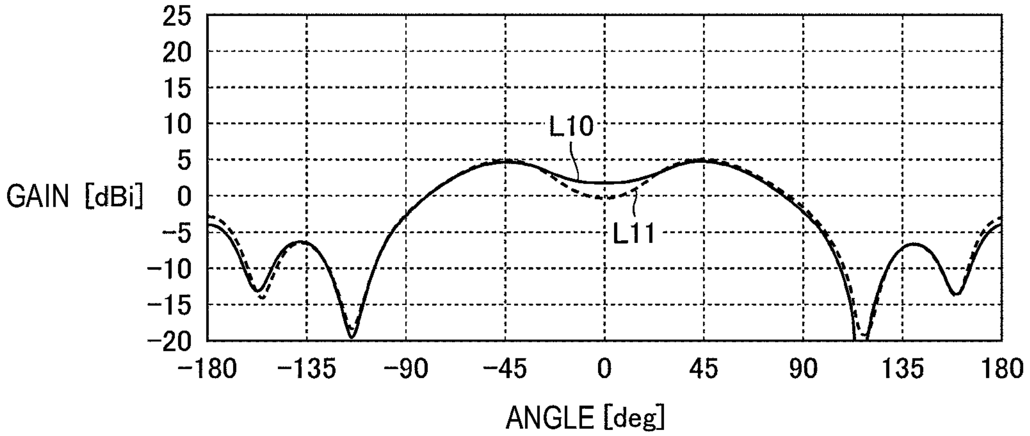

FIGS. 6A and 6B are provided for the explanations of the gain in Embodiment 1 illustrated in FIG. 5B and the gain in the comparative example illustrated in FIG. 5A. FIG. 6A is a plan view of the antenna module 100 according to Embodiment 1, and FIG. 6B illustrates the gain achieved in Embodiment 1 and the gain achieved in the comparative example. The horizontal axis of the graph in FIG. 6B represents the angle from the direction (Z-axis direction) normal to the antenna module to the X-axis direction, and the vertical axis of the graph represents the peak gain. L10, which is the solid line in the graph in FIG. 6B, denotes the gain of the antenna module 100 according to Embodiment 1. L11, which is the broken line in the graph, denotes the gain of the antenna module 100# according to the comparative example.

Referring to FIGS. 6A and 6B, there is not much difference between the overall shape (shape of the main lobe and side lobes) of the gain spectrum of the antenna module 100 according to Embodiment 1 and the overall shape of the gain spectrum of the antenna module 100# according to the comparative example; however, the gain in the main lobe (around 0°) of the antenna module 100 according to Embodiment 1 is greater than that of the antenna module 100# according to the comparative example. This indicates that the current-interrupting elements 150 are conducive to enhanced directivity.

Figures 7A, 7B:
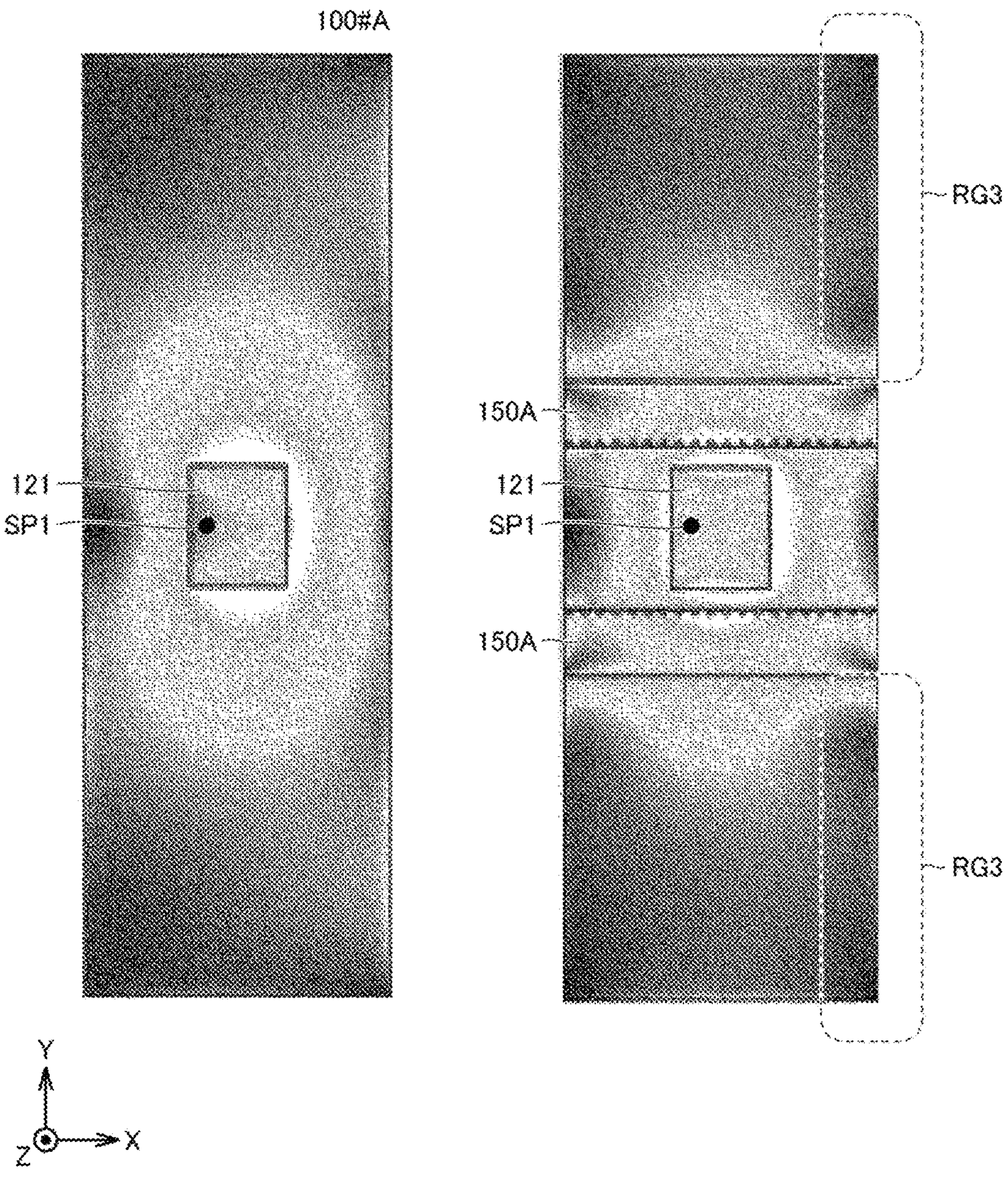
FIGS. 7A and 7B illustrate the current distribution in a ground electrode provided with current-interrupting elements extending in a direction parallel to a polarization direction and the current distribution in a ground electrode in a comparative example in which the current-interrupting elements are not provided.

FIGS. 7A and 7B illustrate the current distribution in the ground electrode GND of an antenna module 100A (see FIG. 7B) and the current distribution in the ground electrode GND of an antenna module 100#A (see FIG. 7A) according to a comparative example. In the antenna module 100A, the current-interrupting elements 150A extend parallel to the polarization direction of the antenna element 121. In the comparative example, the current-interrupting elements are not provided. The dielectric substrate 130 and the ground electrode GND in FIGS. 7A and 7B are rectangular with long sides parallel to the Y axis. The current-interrupting elements 150A in FIG. 7B are discretely located away from the antenna element 121 in the Y-axis direction.

As in the previous case, it can be seen from FIGS. 7A and 7B that the difference between with and without the current-interrupting elements 150A accounts for the difference in the current distribution in the ground electrode GND. The current intensity in regions RG3 (see FIG. 7B) of the ground electrode GND farther than the current-interrupting elements 150A from the antenna element 121, in particular, is lower than the current intensity in the corresponding region in the comparative example.

Figure 8A:
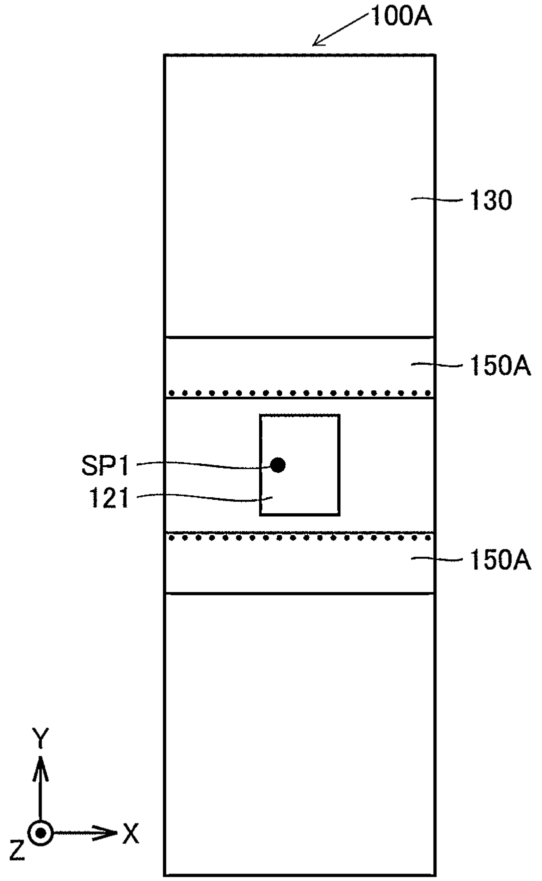
FIGS. 8A and 8B are provided for the explanations of the gain in Embodiment 1 illustrated in FIG. 7B and the gain in the comparative example illustrated in FIG. 7A.
Figure 8B:
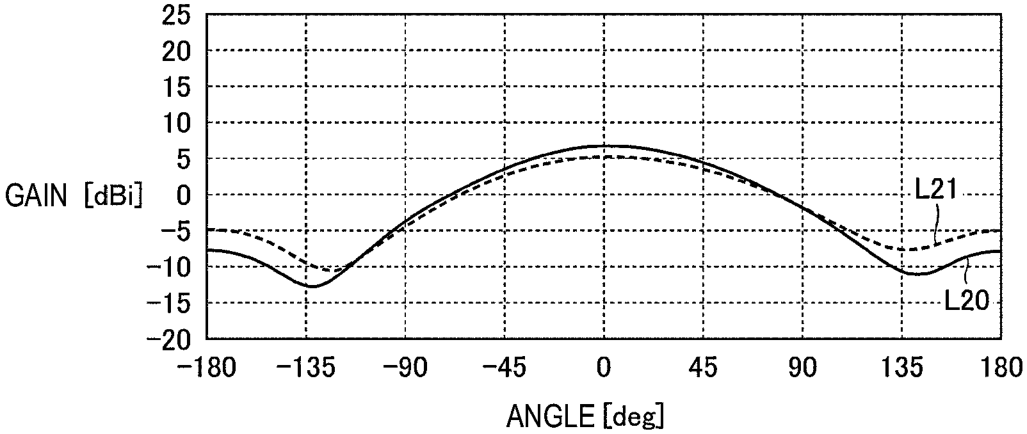

FIGS. 8A and 8B are provided for the explanations of the gains of the antenna modules illustrated in FIGS. 7A and 7B, or more specifically, the gain of the antenna module 100A in which the current-interrupting elements 150A in FIGS. 7A and 7B are provided and the gain of the antenna module 100#A according to the comparative example. FIG. 8A is a plan view of the antenna module 100A, and FIG. 8B illustrates the gain of the antenna module 100A and the gain of the antenna module 100#A. The horizontal axis of the graph in FIG. 8B represents the angle from the direction (Z-axis direction) normal to the antenna module to the Y-axis direction, and the vertical axis of the graph represents the peak gain. L20, which is the solid line in the graph in FIG. 8B, denotes the gain of the antenna module 100A. L21, which is the broken line in the graph, denotes the gain of the antenna module 100#A according to the comparative example.

As in the case of FIGS. 6A and 6B, it can be seen from FIGS. 8A and 8B that there is not much difference between the overall shape of the gain spectrum of the antenna module 100A and the overall shape of the gain spectrum of the antenna module 100#A according to the comparative example; however, the gain in the main lobe (around 0°) of the antenna module 100A is greater than that of the antenna module 100#A. This indicates that the current-interrupting elements 150A are conducive to enhanced directivity.

That is, the current-interrupting elements are provided to the ground electrode for the purpose of adjusting the current distribution in the ground electrode. In this way, the directivity of the antenna module including the planar antenna elements according to Embodiment 1 is adjusted without necessitating an additional radiation electrode.

(Modifications of Current-Interrupting Element)

Although the current-interrupting element in Embodiment 1 is constructed of a planar electrode parallel to a ground electrode and vias through which the planar electrode is connected to the ground electrode, modifications may be made to the current-interrupting element.

Figure 9:
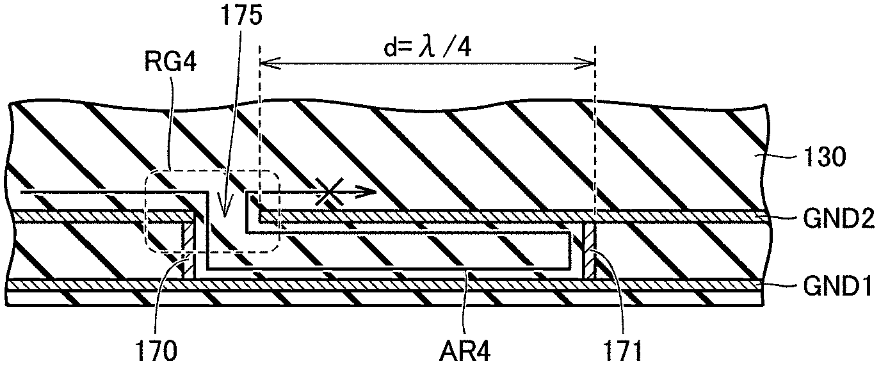
FIG. 9 is provided for the explanation of a first modification of the current-interrupting element.

The following describes a first modification with reference to FIG. 9. Two ground electrodes lie in parallel in different layers and are denoted by GND1 and GND2, respectively. The ground electrode GND2 is closer to the upper surface than the other ground electrode and has a slit 175. A portion including one of two opposite edges of the slit 175 is connected to the ground electrode GND1 through a via 170. The ground electrodes GND1 and GND2 are connected to each other through a via 171 at a λ/4 distance from the other edge of the slit 175. As denoted by an arrow AR4, the current from the ground electrode GND2 passes through the via 170, the ground electrode GND1, and the via 171 and then flows into the ground electrode GND2. The currents in the opposite directions cancel each other out at the slit 175 of the ground electrode GND2 (i.e., in a region RG4 in FIG. 9), and consequently, the current flowing through the ground electrode GND2 is interrupted. In this way, the current distribution in the ground electrodes is adjusted, and the directivity of the antenna module is adjusted accordingly.

Figure 10:
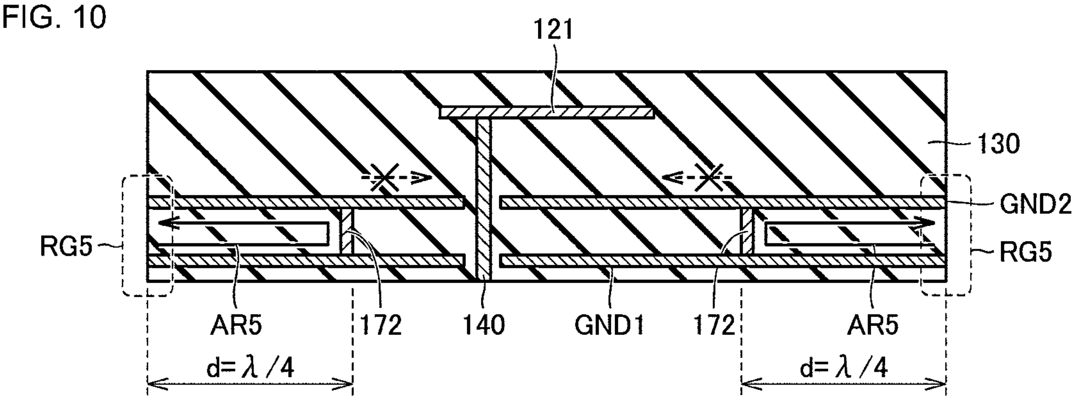
FIG. 10 is provided for the explanation of a second modification of the current-interrupting element.

The following describes a second modification with reference to FIG. 10, in which an antenna module includes two ground electrodes denoted by GND1 and GND2, respectively. The ground electrodes GND1 and GND2 are connected to each other through vias 172, each of which is at a λ/4 distance from the corresponding edge of the ground electrode GND2.

In the second modification illustrated in FIG. 10, the edge portions of the ground electrodes GND1 and GND2 (i.e., regions RG5 in FIG. 10) are sites where the currents flowing through the ground electrodes cancel each other out. Thus, the current distribution in the ground electrodes is adjusted, and the directivity of the antenna module is adjusted accordingly.

Embodiment 2

The current-interrupting elements in Embodiment 1 are provided to the ground electrode for the purpose of adjusting the directivity of the antenna module including one antenna element.

The following describes Embodiment 2, in which the directivity of an antenna module including more than one antenna element is adjusted in a manner so as to improve the isolation between antenna elements. To that end, a current-interrupting element is provided between adjacent antenna elements.

Figure 11:
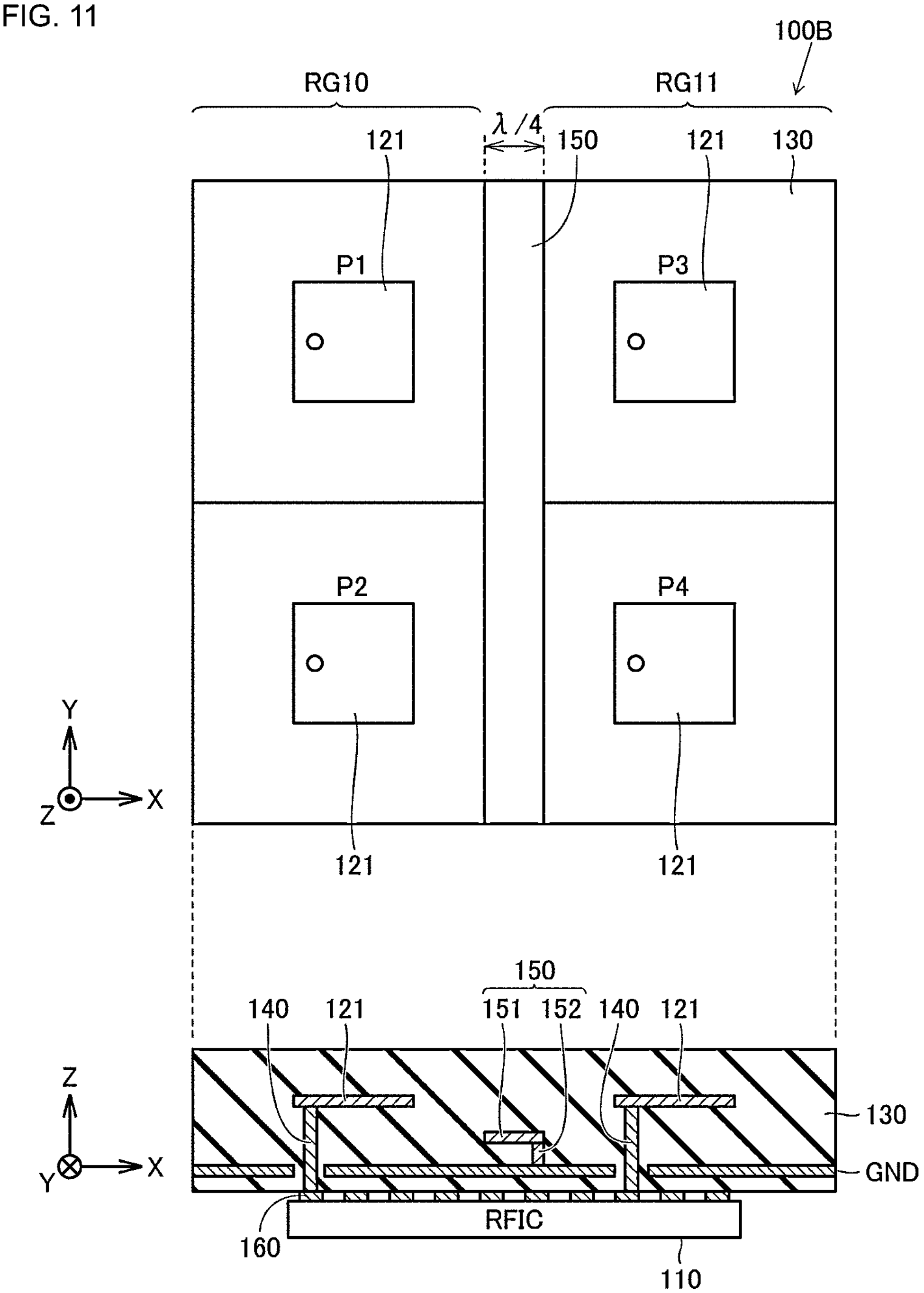
FIG. 11 includes a plan view and a sectional view for the detailed explanation of an antenna module according to Embodiment 2.

FIG. 11 includes a plan view (in the upper section) and a sectional view (in the lower section) for the detailed explanation of an antenna module 100B according to Embodiment 2. The antenna module 100B includes four antenna elements 121 in a two-by-two array. For greater clarity of the individual antenna elements on the drawing plane of the plan view in FIG. 11, the antenna element at the upper left is denoted by P1, the antenna element at the lower left is denoted by P2, the antenna element at the upper right is denoted by P3, and the antenna element at the lower right is denoted by P4.

The current-interrupting element 150, which is structurally similar to the current-interrupting element in Embodiment 1, is disposed between the antenna elements P1 and P3 of the antenna module 100B and between the antenna elements P2 and P4 of the antenna module 100B in a manner so as to extend along the Y axis. The antenna elements P1 and P2 are disposed in a region RG10, and the antenna elements P3 and P4 are disposed in a region RG11. With the current-interrupting element 150 being placed as above, the flow of current between the region RG10 and the region RG11 is interrupted in the ground electrode GND. The directivity of the antenna module 100B is thus adjusted in a manner so as to improve the isolation between each antenna element in the region RG10 and each antenna element in the region RG11.

Figure 12:
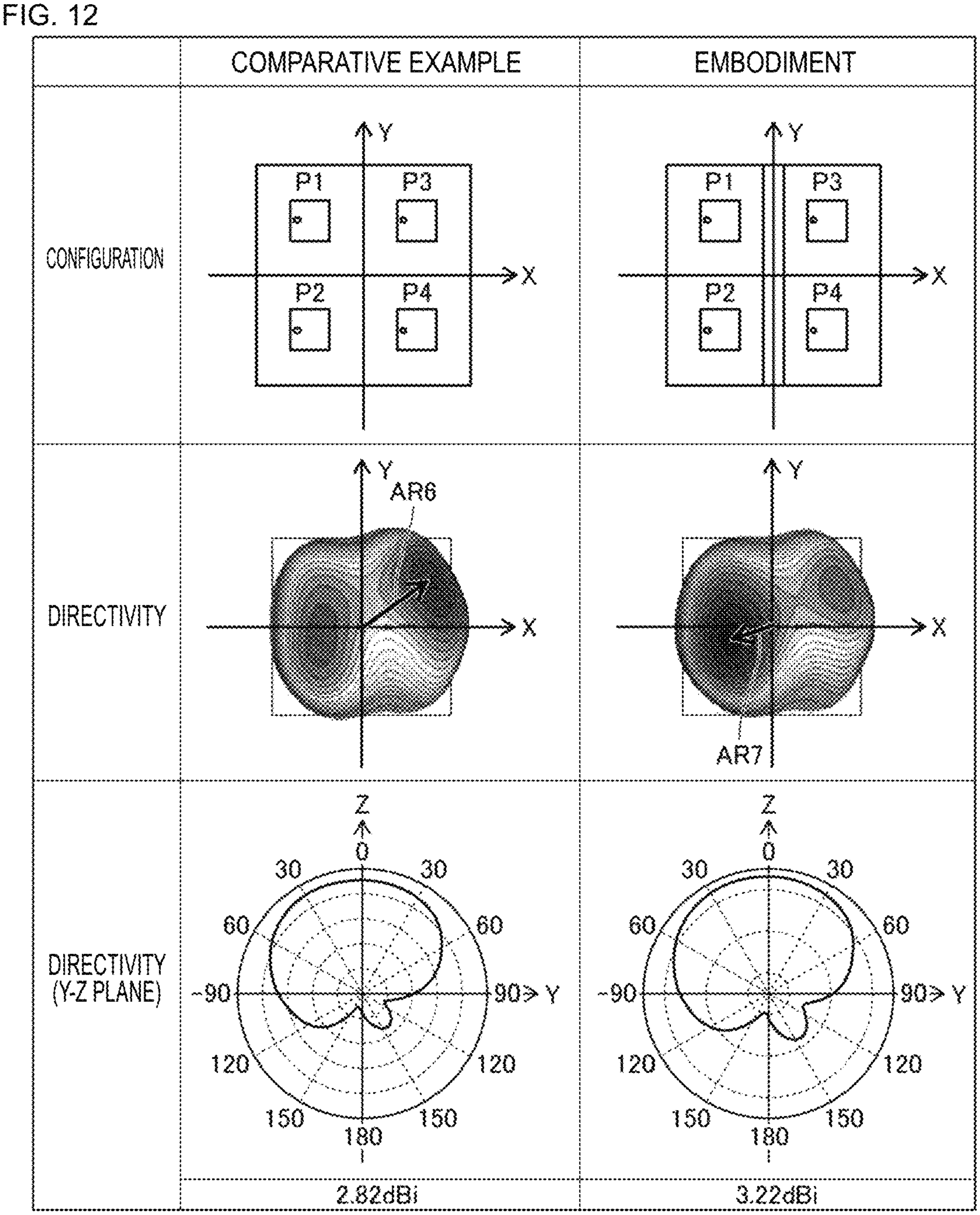
FIG. 12 is provided for the comparison of the directivity in Embodiment 2 and the directivity in a comparative example.
Figure 13:
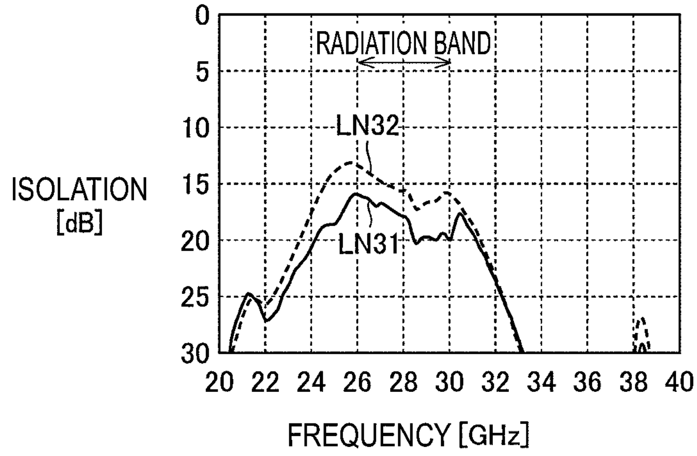
FIG. 13 is provided for the comparison of the antenna characteristics in Embodiment 2 and the antenna characteristics in the comparative example.
Figure 13:
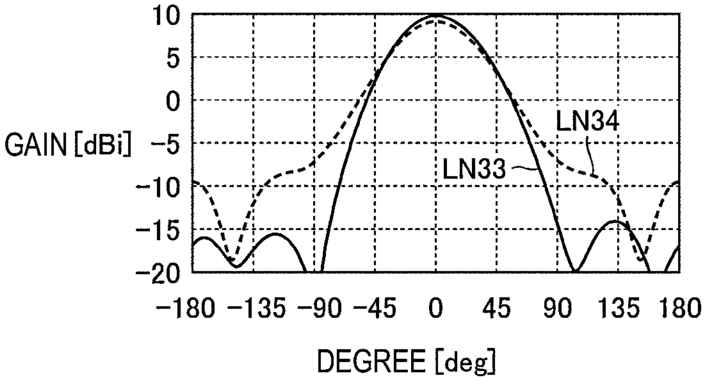
Figure 13:
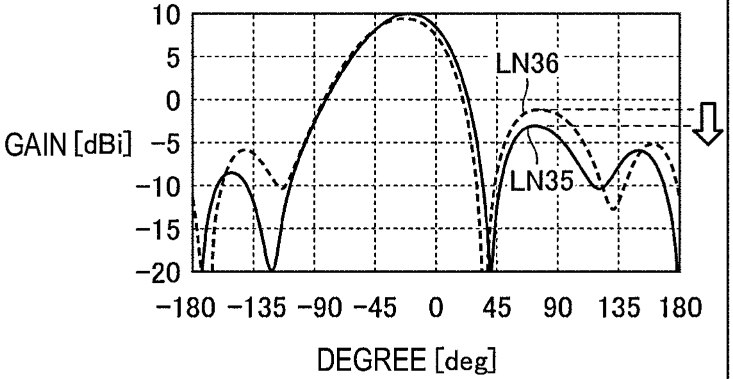

With reference to FIG. 12 and FIG. 13, the following describes the directivity and the antenna characteristics of the antenna module 100B according to Embodiment 2 in which the current-interrupting element 150 is disposed as in illustrated FIG. 11, in comparison with a comparative example in which the current-interrupting element 150 is not provided.

FIG. 12 is provided for the comparison of the directivity in Embodiment 2 and the directivity in the comparative example. The upper section of FIG. 12 illustrates the schematic configuration of the antenna module according to Embodiment 2 and the schematic configuration of an antenna module according to a comparative example. The middle section and the lower section of FIG. 12 illustrate the results obtained from simulation conducted in a manner so as to excite the antenna element P1 only. The gain distributions of the respective antenna modules viewed in plan in the Z-axis direction are illustrated in the middle section, and the gain distributions in Y-Z planes of the respective antenna modules are illustrated in the lower section. In the middle section of FIG. 12, darker regions imply that the gain is greater. The values of peak gain on the Z axis are given in the lower section of FIG. 12. The simulation described with reference to FIGS. 12 and 13 involves the radiation of radio waves in a frequency band with a center frequency of 28 GHz (e.g., the 26- to 30-GHz range). The frequency band concerned is hereinafter also referred to as a radiation bandwidth.

It can be seen from the middle section of FIG. 12 that the region of the highest radiation intensity (peak region) in the antenna module according to the comparative example corresponds to the upper part of the antenna element P3 as marked with an arrow AR6. The peak region in the antenna module 100B according to Embodiment 2 corresponds to the upper part of the antenna element P2 as marked with an arrow AR7. This is due to a current interruption in the ground electrode GND caused by the current-interrupting element 150, or more specifically, an interruption of current from the antenna element P1 side (the region RG10) to the antenna element P3 side (the region RG11).

The distance from the center of the antenna module 100B according to Embodiment 2 to its peak region on the X-Y plane is less than the distance from the center of the antenna module according to the comparative example to its peak region; that is, the arrow AR7 is shorter than the arrow AR6. As can be seen from the tones of the color in the drawing, the gain in the peak region of the antenna module 100B is greater than that of the antenna module according to the comparative example. It can be seen from the lower section of FIG. 12 that the present embodiment has superiority over the comparative example in the peak gain on the Z axis (2.82 dBi vs. 3.22 dBi).

That is, the current-interrupting element 150 enables the antenna element to achieve the gain spectrum with the peak region in close proximity to the Z axis along which the radio waves are radiated and to hold superiority over the comparative example in peak gain. This is conducive to the enhanced directivity of the antenna module.

The same holds true for the other antenna elements; that is, the peak regions (not illustrated in FIG. 12) in the antenna elements P2 to P4 are in close proximity to the Z axis, and the directivity of the antenna module as a whole is improved accordingly.

The upper section of FIG. 13 illustrates the isolation characteristics between the antenna element P1 and the antenna element P3. The middle section and the lower section of FIG. 13 illustrate the gain obtained by exciting all of the antenna elements. The gain in the case of radio-wave radiation with no tilt in the Y-Z plane is illustrated in the middle section, and the gain in the case of radio-wave radiation at a tilt of −30° in the Y-Z plane is illustrated in the lower section.

LN31, LN33, and LN35, which are the solid lines in FIG. 13, each denotes the gain of the antenna module 100B according to Embodiment 2. LN32, LN34, and LN36, which are the broken lines in FIG. 13, each denotes the gain of the antenna module according to the comparative example.

Referring to the upper section of FIG. 13, in which the isolation between the antenna element P1 and the antenna element P3 is illustrated, the degree of isolation in the radiation bandwidth concerned (i.e., the 26- to 30-GHz range) is greater in Embodiment 2 in which the current-interrupting element 150 are provided; that is, Embodiment 2 has superiority over the comparative example in the isolation characteristics between the antenna element P1 and the antenna element P3.

Referring to the middle section of FIG. 13, in which the gain in the case of radiation with no tilt is illustrated, the gain achieved through the radiation of beams at a tilt angle of 0° (i.e., in the Z-axis direction) is greater in the antenna module 100B according to Embodiment 2 than in the antenna module according to the comparative example, whereas the side-lobe gain is smaller in the antenna module 100B according to Embodiment 2 than in the antenna module according to the comparative example.

The same holds true for the case of the radiation of beams at a tilt angle of −30° (see the lower section of FIG. 13); that is, the gain achieved through the radiation of beams at a tilt angle of −30° is greater in the antenna module 100B according to Embodiment 2 than in the antenna module according to the comparative example, whereas the side-lobe gain is smaller in the antenna module 100B according to Embodiment 2 than in the antenna module according to the comparative example.

The current-interrupting element 150 between the antenna elements has an improvement effect on directivity and antenna characteristics irrespective of the tilt angle.

Although the antenna module including the four antenna elements in a two-by-two array has been described so far with reference to FIG. 11, the configuration concerned may be adopted into an antenna module including more than four antenna elements.

Modification 1

As described above with reference to FIG. 11, the antenna module 100B according to Embodiment 2 includes the antenna elements P1 and P2 in the region RG10, the antenna elements P3 and P4 in the region RG11, and the current-interrupting element 150 between the region RG10 and the region RG11.

The following describes Modification 1 of Embodiment 2, in which an additional current-interrupting element is disposed to improve the isolation characteristics between the antenna element P1 and the antenna element P2 and the isolation characteristics between the antenna element P3 and the antenna element P4. The additional current-interrupting element is disposed between the antenna elements P1 and P2 in the region RG10 and between the antenna elements P3 and P4 in the region RG11.

Figure 14:
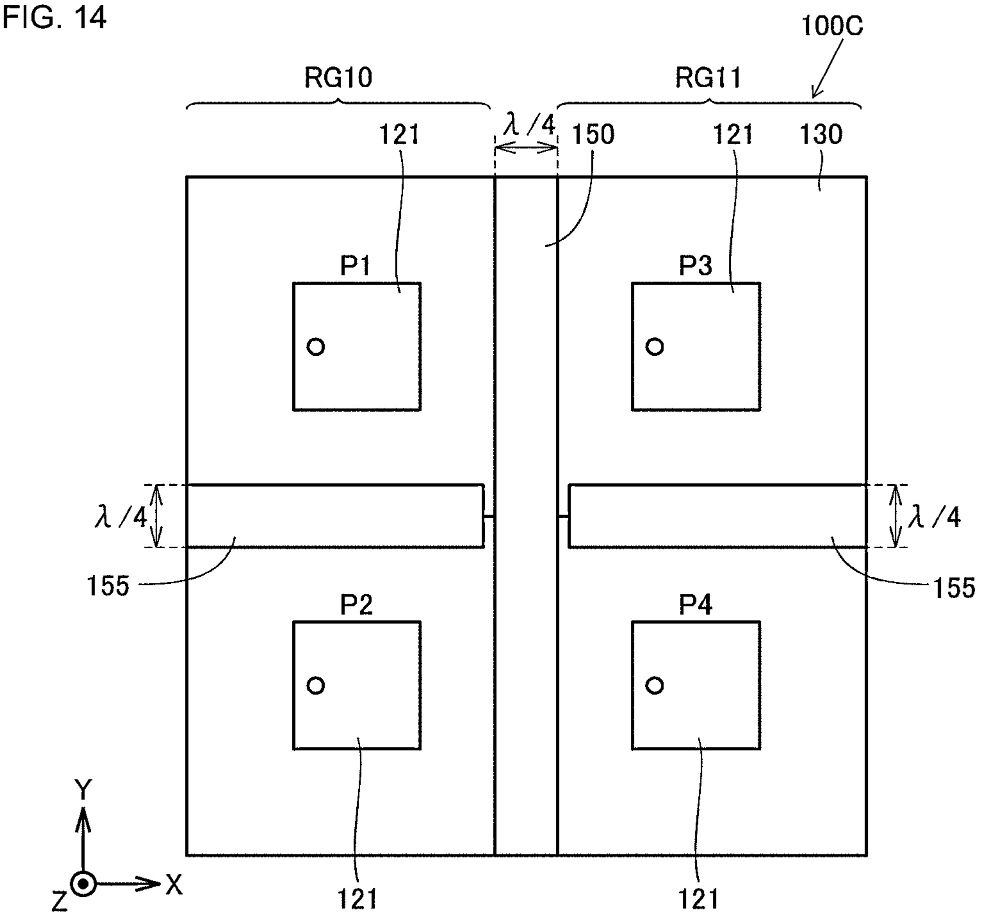
FIG. 14 is a plan view of an antenna module according to Modification 1 of Embodiment 2.

FIG. 14 is a plan view of an antenna module 100C according to Modification 1 of Embodiment 2. The antenna module 100C is obtained by adding a current-interrupting element 155 to the antenna module 100B described with reference to FIG. 11. Description of constituent components that holds true for both the antenna module 100B in FIG. 11 and the antenna module 100C will be omitted.

Referring to FIG. 14, the current-interrupting element 155 is disposed between the antenna element P1 and the antenna element P2 and between the antenna element P3 and the antenna element P4 in a manner so as to extend along the X axis. As with the current-interrupting element 150, the current-interrupting element 155 includes a planar electrode parallel to the ground electrode GND and vias connecting the planar electrode to the ground electrode GND (not illustrated in FIG. 14, which does not include a sectional view).

Specifically, the antenna module 100C includes the current-interrupting element 150 (first current-interrupting element) between antenna elements adjacent to each other in the X-axis direction (first direction) and the current-interrupting element 155 (second current-interrupting element) between antenna elements adjacent to each other in the Y-axis direction (second direction) orthogonal to the X-axis direction.

The dimension of the planar electrode of the current-interrupting element 155 in the Y axis direction is λ/4, where λ is the wavelength of the radio waves radiated from the antenna element 121. The planar electrode of the current-interrupting element 155 may have an open edge facing the antenna elements P1 and P3 or may have an open edge facing the antenna elements P2 and P4.

Figure 15:
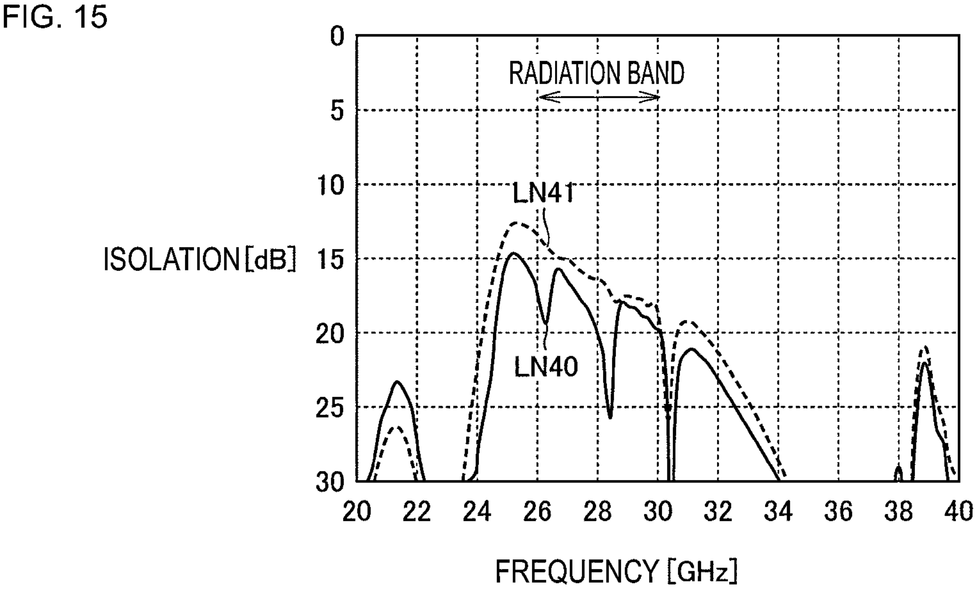
FIG. 15 is provided for the comparison of the isolation characteristics in Modification 1 and the isolation characteristics in a comparative example.

FIG. 15 is provided for the comparison of the isolation characteristics of the antenna module 100C according to Modification 1 and the isolation characteristics of an antenna module according to a comparative example. Unlike the antenna module 100C, the antenna module according to the comparative example does not include the current-interrupting element 155 between the antenna element P1 and the antenna element P2. More specifically, the antenna module according to the comparative example is structurally identical to the antenna module 100B in FIG. 11. The horizontal axis of the graph in FIG. 15 represents the frequency, and the vertical axis of the graph represents the isolation characteristics between the antenna element P1 and the antenna element P2. LN40, which is the solid line in the graph, denotes the isolation in Modification 1. LN41, which is the broken line in the graph, denotes the isolation in the comparative example.

As can be seen from FIG. 15, the degree of isolation in the radiation bandwidth (26- to 30-GHz range) in which the radio waves radiated from the antenna elements lie is greater in Modification 1 than in the comparative example; that is, Modification 1 has superiority over the comparative example in the isolation characteristics between the antenna element P1 and the antenna element P2.

That is, the antenna elements are arranged in an array and provided with the current-interrupting elements. One of the current-interrupting elements is disposed between the antenna elements adjacent to each other in one of two directions orthogonal to each other, and the other current-interrupting element is disposed between the antenna elements adjacent to each other in the other direction. In this way, the directivity of the radio waves radiated from the antenna module is improved without necessitating an additional radiation electrode, and the isolation characteristics between the antenna elements is also improved.

The configuration of Modification 1 is better suited to dual-polarized antenna modules in which each antenna element is designed for the radiation of the radio waves polarized in the two respective directions. The configuration of Modification 1 may be adopted into an antenna module including more than four antenna elements.

Modification 2

With reference to FIGS. 16 to 20, the following describes Modification 2 of Embodiment 2, or more specifically, variations of the configuration of the current-interrupting element. For easy-to-understand illustration, the following description will be given on the assumption that an antenna module according to Modification 2 includes a linear array of two antenna elements. Alternatively, the antenna module according to Modification 2 may be structurally identical to the antenna modules in FIG. 11; that is the antenna module may include a two-dimensional two-by-two array of antenna elements. Still alternatively, the antenna module according to Modification 2 may include a two-dimensional array of more than four antenna elements. As in the case with Modification 1 in FIG. 14, the antenna elements may be arranged in a two-dimensional array with one current-interrupting element disposed between the antenna elements adjacent to each other in the first direction and the other current-interrupting element disposed between the antenna elements adjacent to each other in the second direction.

(a) First Example

Figure 16:
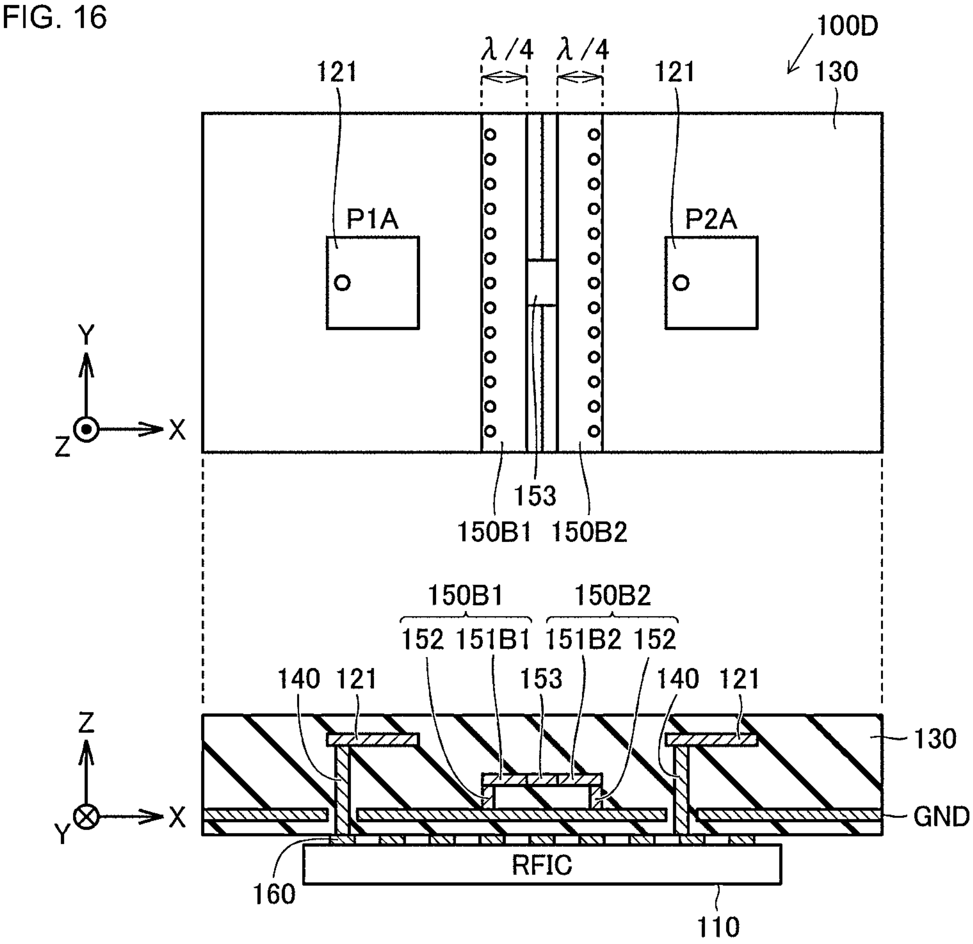
FIG. 16 is provided for the explanation of a first example of the current-interrupting element in Embodiment 2.

FIG. 16 includes a plan view (in the upper section) and a sectional view (in the lower section) for the explanation of a first example of the current-interrupting element in Embodiment 2. FIG. 16 illustrates an antenna module 100D, with two current-interrupting elements disposed between two antenna elements adjacent to each other in the X-axis direction. The current-interrupting elements, respectively, are denoted by 150B1 and 150B2. The antenna elements, respectively, are denoted by P1A and P2A. The current-interrupting elements 150B1 and 150B2, which are structurally similar to the current-interrupting element 150 in Embodiment 1, include their respective planar electrodes and the vias 152. The planar electrodes, respectively, are denoted by 151B1 and 151B2 and each have a first end portion and a second edge portion. The dimension of each of the current-interrupting elements 150B1 and 150B2 in the direction from the first edge portion to the second edge portion is λ/4. The planar electrodes 151B1 and 151B2 are connected to the ground electrode GND through the vias 152 and are substantially L-shaped when viewed in section.

The current-interrupting elements 150B1 and 150B2 are in parallel and extend along the Y axis in FIG. 16. The current-interrupting element 150B1 is closer to the antenna element P1A than the current-interrupting element 150B2, and the current-interrupting element 150B2 is closer to the antenna element P2A than the current-interrupting element 150B1.

The current-interrupting element 150B1 is disposed in such a manner that the open edge (second edge portion) of the planar electrode 151B1 faces the antenna element P2A. The current-interrupting element 150B2 is disposed in such a manner that the open edge (second edge portion) of the planar electrode 151B2 faces the antenna element P1A. That is, the current-interrupting elements 150B1 and 150B2 are disposed in such a manner that the open edges of their respective planar electrodes face each other. The open edge of the current-interrupting element 150B1 and the open edge of the current-interrupting element 150B2 face each other with part of one open edge and part of the other open edge being electrically connected to each other through an planar electrode 153.

The two current-interrupting elements are disposed with their respective open edges facing each other such that a capacitive component is formed between the open edges. Part of one open edge and part of the other open edge are electrically connected to each other such that an inductive component is formed therebetween. This arrangement enables dual-mode resonance, namely, odd-mode resonance and even-mode resonance. The effect of causing current interruptions is produced over a wide range of frequencies accordingly.

Although the current-interrupting elements 150B1 and 150B2 are disposed with their respective open edges facing each other, it is not always required that the two open edges be partially connected to each other. For example, the dielectric substrate 130 with different dielectric constants can create a state in which the current-interrupting elements 150B1 and 150B2 resonate in two resonance modes with no connection being formed between the two open edges.

Figure 17:
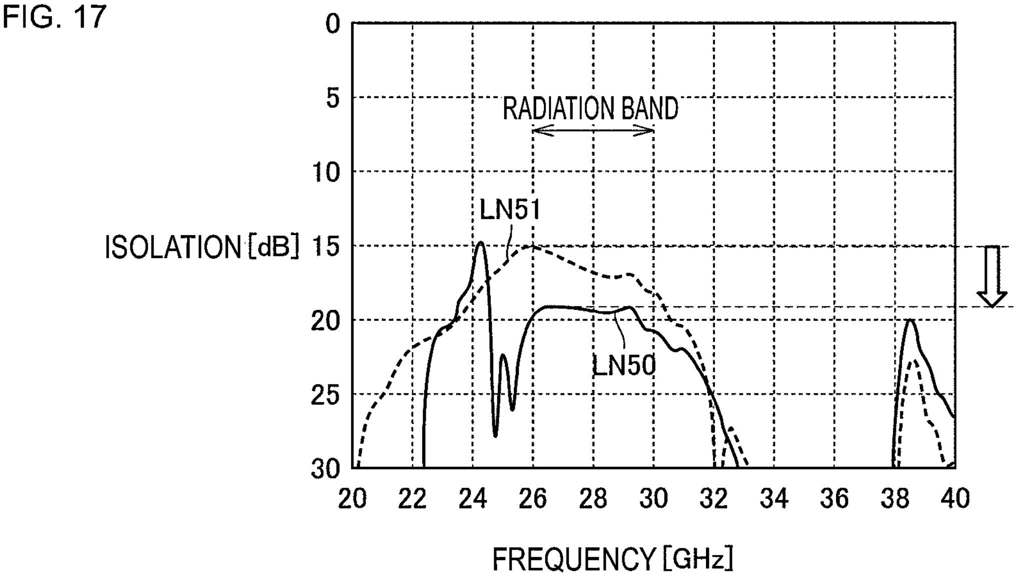
FIG. 17 is provided for the comparison of the isolation characteristics of the antenna module illustrated in FIG. 11 and the isolation characteristics of the antenna module illustrated in FIG. 16.

FIG. 17 is provided for the explanation of the isolation characteristics of the antenna module 100D illustrated in FIG. 16. A comparative example in FIG. 17 is the antenna module 100B including the current-interrupting element 150 illustrated in FIG. 11. The horizontal axis of the graph in FIG. 17 represents the frequency, and the vertical axis of the graph represents the isolation characteristics between the antenna element P1A and the antenna element P2A. LN50, which is the solid line in the graph, denotes the isolation in the antenna module 100D. LN51, which is the broken line in the graph, denotes the isolation in the comparative example.

As can be seen from FIG. 17, the degree of isolation in the radiation bandwidth (26- to 30-GHz range) in which the radio waves radiated from the antenna elements lie is greater in the antenna module 100D than in the comparative example; that is, the antenna module 100D offers a further level of superiority over the comparative example in the isolation characteristics between the antenna element P1A and the antenna element P2A.

(b) Second Example

Figure 18:
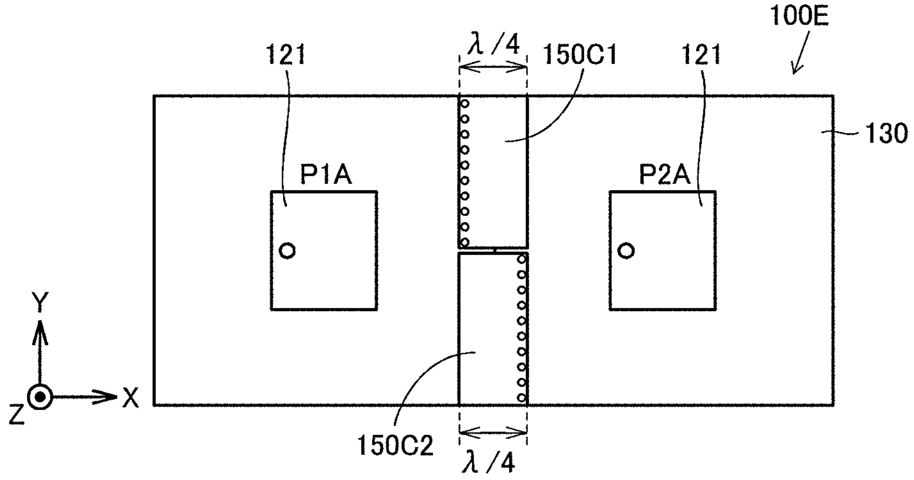
FIG. 18 is provided for the explanation of a second example of the current-interrupting element in Embodiment 2.

FIG. 18 is a plan view for the explanation of a second example of the current-interrupting element in Embodiment 2. FIG. 18 illustrates an antenna module 100E, with two discrete current-interrupting elements disposed between two adjacent antenna elements. The current-interrupting elements, respectively, are denoted by 150C1 and 150C2. The antenna elements, respectively, are denoted by P1A and P2A. The current-interrupting elements 150C1 and 150C2 are alternately disposed along the Y axis.

The current-interrupting elements 150C1 and 150C2 are, in principle, each structurally identical to the current-interrupting element 150 in Embodiment 1; that is, the current-interrupting elements 150C1 and 150C2 each include vias and a planar electrode whose dimension in the X-axis direction is λ/4. The current-interrupting element 150C1 has an open edge (second edge portion) facing the antenna element P2A, and the current-interrupting element 150C2 has an open edge (second edge portion) facing the antenna element P1A.

Although FIG. 18 illustrates an example in which the current-interrupting elements 150C1 and 150C2 are disposed between the antenna element P1A and the antenna element P2A, more than two discrete current-interrupting elements may be disposed between the antenna element P1A and the antenna element P2A. For example, four current-interrupting elements may be disposed along the Y axis with their open edges in a staggered arrangement.

Figure 19:
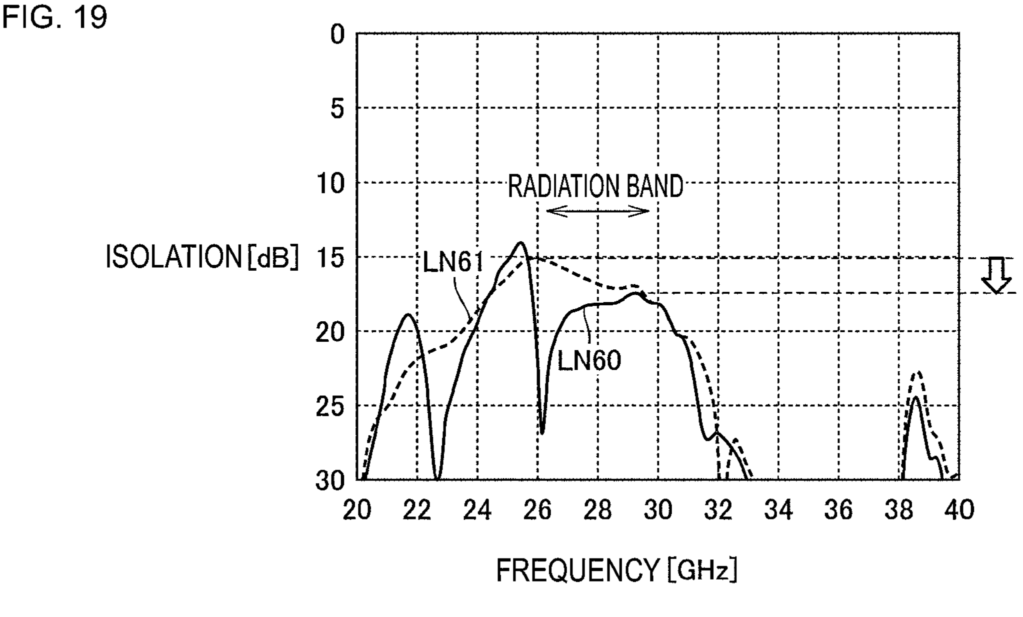
FIG. 19 is provided for the comparison of the isolation characteristics of the antenna module illustrated in FIG. 11 and the isolation characteristics of the antenna module illustrated in FIG. 18.

FIG. 19 is provided for the explanation of the isolation characteristics of the antenna module 100E in FIG. 18. As in the case with the first example, a comparative example in FIG. 19 is the antenna module 100B including the current-interrupting element 150 illustrated in FIG. 11. The horizontal axis of the graph in FIG. 19 represents the frequency, and the vertical axis of the graph represents the isolation characteristics between the antenna element P1A and the antenna element P2A. LN60, which is the solid line in the graph, denotes the isolation in the antenna module 100E. LN61, which is the broken line in the graph, denotes the isolation in the comparative example.

As can be seen from FIG. 19, the degree of isolation in the radiation bandwidth (26- to 30-GHz range) in which the radio waves radiated from the antenna elements lie is greater in the antenna module 100E than in the comparative example; that is, the antenna module 100E offers a further level of superiority over the comparative example in the isolation characteristics between the antenna element P1A and the antenna element P2A.

(c) Third Example

Figure 20:
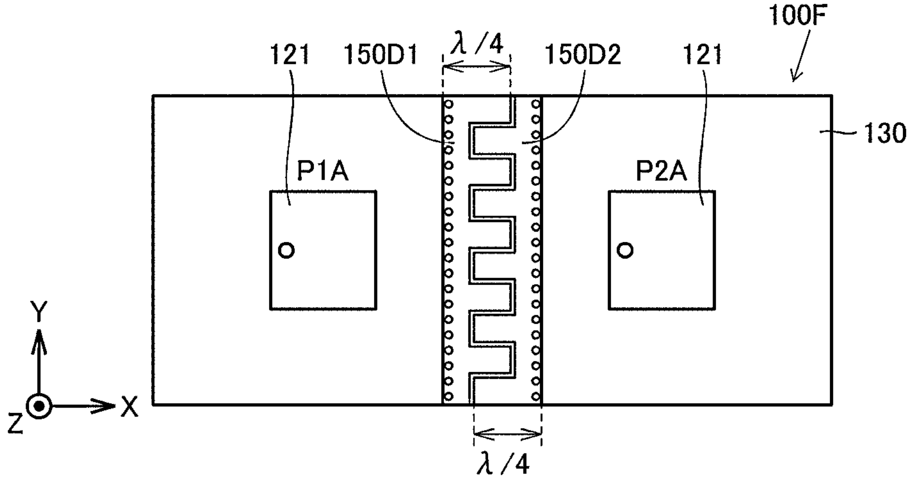
FIG. 20 is provided for the explanation of a third example of the current-interrupting element in Embodiment 2.

FIG. 20 is a plan view for the explanation of a third example of the current-interrupting element in Embodiment 2. FIG. 20 illustrates an antenna module 100F, with two discrete current-interrupting elements disposed between two adjacent antenna elements. The current-interrupting elements, respectively, are denoted by 150D1 and 150D2. The antenna elements, respectively, are denoted by P1A and P2A. The current-interrupting elements 150D1 and 150D2 each have a comb teeth-shaped open edge. The respective open edges mesh in such a manner that the recessed portions of the comb teeth of one open edge fit in the protruding portions of the comb teeth of the other open edge. Each of the protruding portions of the comb teeth of the current-interrupting elements is λ/4 long.

As in the case with the aforementioned configurations, the current-interrupting elements 150D1 and 150D2 have an improvement effect on the antenna isolation characteristics between the antenna element P1A and the antenna element P2A.

(d) Fourth Example

Figure 21:
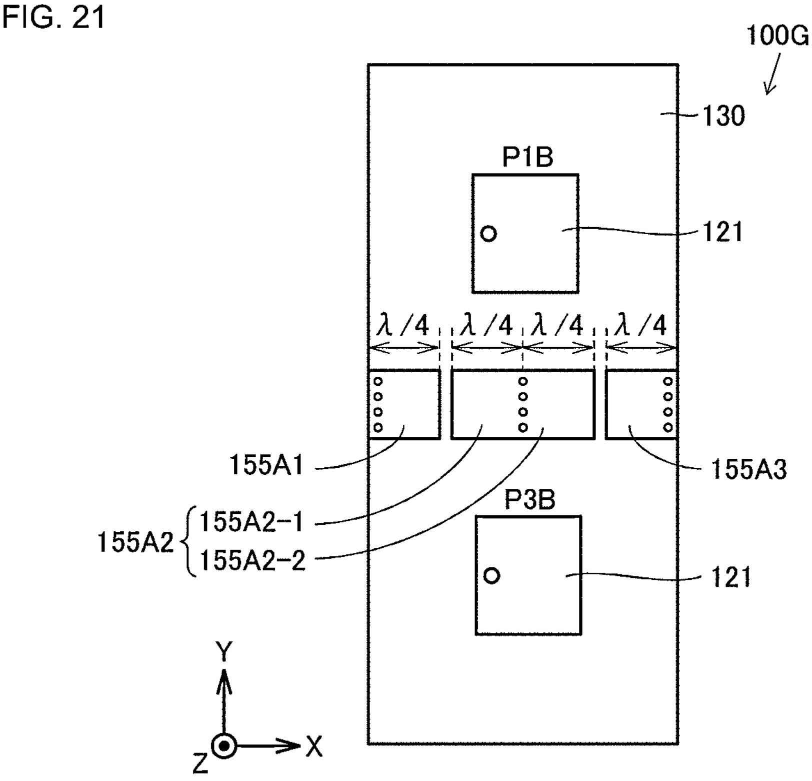
FIG. 21 is provided for the explanation of a fourth example of the current-interrupting element in Embodiment 2.

FIG. 21 is provided for the explanation of a fourth example of the current-interrupting element in Embodiment 2. FIG. 21 illustrates an antenna module 100G, with four current-interrupting elements disposed between two antenna elements adjacent to each other in the Y-axis direction. The current-interrupting elements, respectively, are denoted by P1B and P3B. The current-interrupting elements, respectively, are denoted by 155A1, 155A2-1, 155A2-2, and 155A3 and are aligned in the X-axis direction. The current-interrupting elements 155A1, 155A2-1, 155A2-2, and 155A3 each include a rectangular planar electrode whose dimension in the X-axis direction is λ/4. The current-interrupting elements 155A2-1 and 155A2-2 in the example illustrated in FIG. 21 are joined to each other to constitute a current-interrupting element 155A2. The current-interrupting element 155A2 includes a rectangular planar electrode whose dimension in the X-axis direction is λ/2.

The current-interrupting element 155A2 is connected to the ground electrode GND through vias aligned in the Y-axis direction along the bisector of the sides in the X-axis direction. The two edge portions of the current-interrupting element 155A2 that are on the opposite sides in the X-axis direction are open edges. The current-interrupting element 155A2 is equivalently realized by the current-interrupting elements 155A2-1 and 155A2-2 that share vias so as to be connected to each other at their back sides. The open edges of the current-interrupting element 155A2 are each at a distance of λ/4 from the vias that connect the current-interrupting element 155A2 to the ground electrode GND.

The current-interrupting element 155A1, or more specifically, its edge portion on the negative side in the X-axis direction is connected to the ground electrode GND through vias aligned in the Y-axis direction. The current-interrupting element 155A1 is disposed in such a manner that the edge portion (open edge) of the current-interrupting element 155A1 on the positive side in the X-axis direction faces the open edge of the current-interrupting element 155A2 on the negative side in the X-axis direction. The current-interrupting element 155A3, or more specifically, its edge portion on the positive side in the X-axis direction is connected to the ground electrode GND through vias aligned in the Y-axis direction. The current-interrupting element 155A3 is disposed in such a manner that the edge portion (open edge) of the current-interrupting element 155A3 on the negative side in the X-axis direction faces the open edge of the current-interrupting element 155A2 on the positive side in the X-axis direction. That is, two pairs of current-interrupting elements arranged face to face are disposed between the antenna elements P1B and P3B of the antenna module 100G and sit side by side in the direction (X-axis direction) in which the radio waves radiated from the antenna elements P1B and the radio waves radiated from P3B are polarized.

The dimension of the dielectric substrate 130 in the X-axis direction may be large enough to include three or more pairs of current-interrupting elements arranged face to face. It is not required that the current-interrupting elements be arranged face to face. Current-interrupting elements of the same shape may be arranged with their respective open edges being located on the same side in one direction (e.g., on the positive side in the X-axis direction).

The current-interrupting elements placed in such a layout causes the interruptions of the current flowing in the X-axis direction through the ground electrode GND, and the current distribution in the ground electrode GND is adjusted accordingly.

Figure 22:
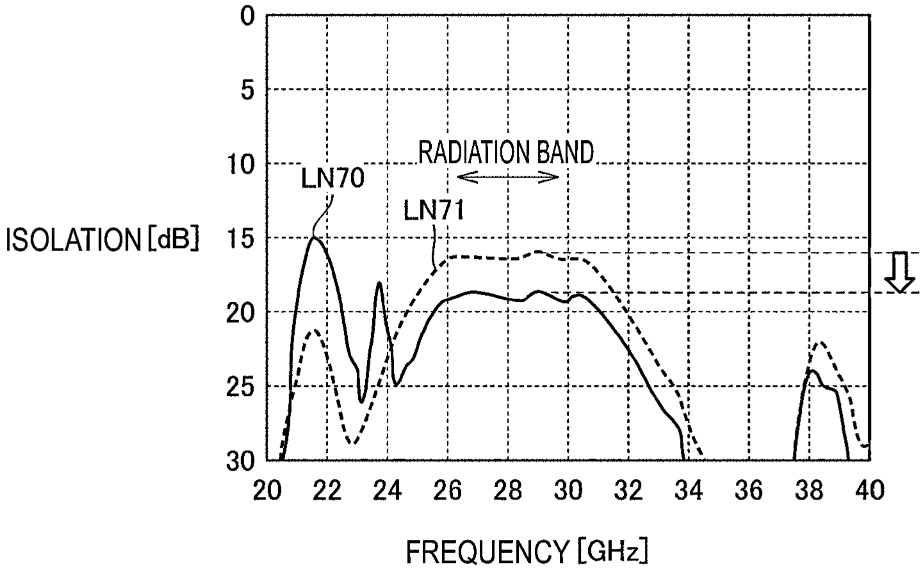
FIG. 22 is provided for the explanation of the isolation characteristics of an antenna module illustrated in FIG. 21.

FIG. 22 is provided for the explanation of the isolation characteristics of the antenna module 100G illustrated in FIG. 21. A comparative example in FIG. 22 is an antenna module in which current-interrupting elements are not provided. The horizontal axis of the graph in FIG. 22 represents the frequency, and the vertical axis of the graph represents the isolation characteristics between the antenna element P1B and the antenna element P3B. LN70, which is the solid line in the graph, denotes the isolation in the antenna module 100G. LN71, which is the broken line in the graph, denotes the isolation in the comparative example.

As can be seen from FIG. 22, the degree of isolation in the radiation bandwidth (26- to 30-GHz range) in which the radio waves radiated from the antenna elements lie is greater in the antenna module 100G than in the comparative example; that is, the antenna module 100G has superiority over the comparative example in the isolation characteristics between the antenna element P1B and the antenna element P3B.

(Effects on XPD)

Such an antenna module including an array of antenna elements can employ beamforming, which involves adjusting the beam radiation direction through the phase shifts in the radio waves radiated from the respective antenna elements. It is commonly known that the radiation of the radio waves from the antenna elements involves a considerably high level of cross polarization, which is the polarization in directions crossing the desired polarization direction. During beamforming, each antenna element is affected by the cross-polarized radiation from an adjacent antenna element. This can cause a decrease in the level of cross-polarization discrimination (XPD). The following describes the effects exerted on XPD by the current-interrupting elements in the present embodiment.

Figure 23:
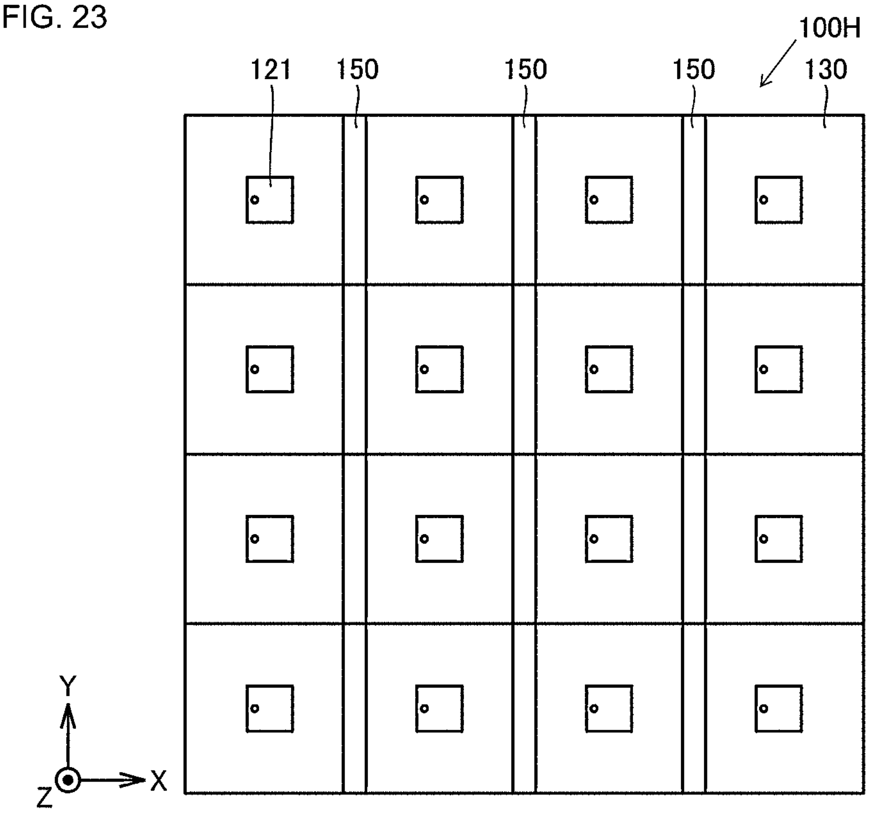
FIG. 23 is a plan view of an antenna module including a four-by-four antenna array provided with current-interrupting elements each of which is structurally identical to the current-interrupting element illustrated in FIG. 11.
Figure 24:
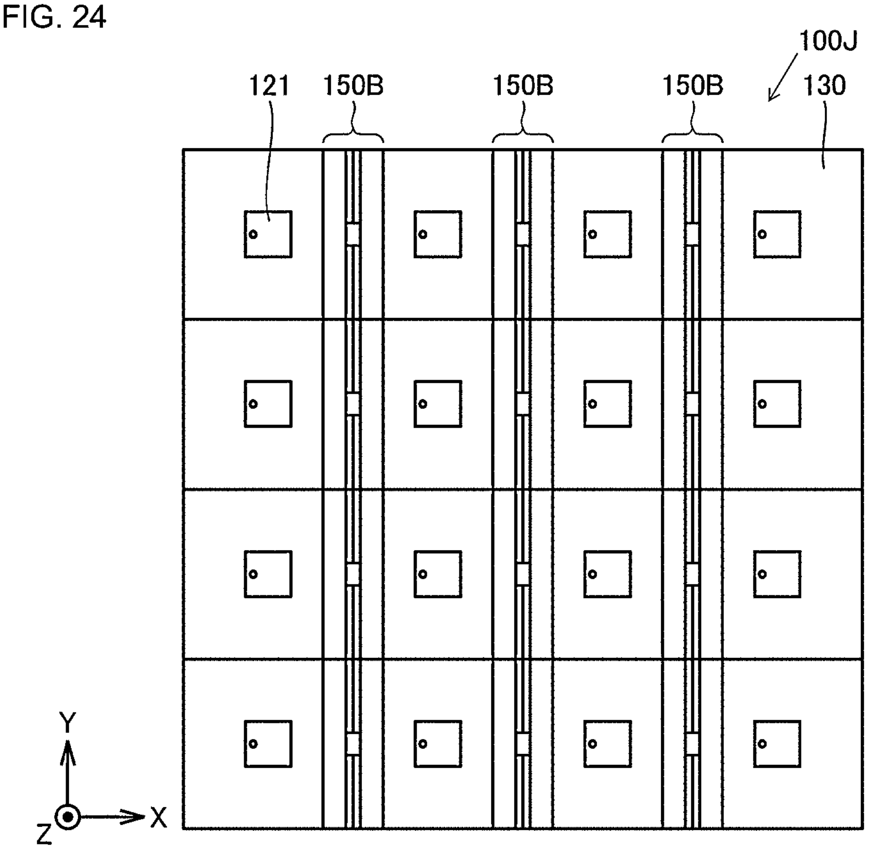
FIG. 24 is a plan view of an antenna module including a four-by-four antenna array provided with current-interrupting elements each of which is structurally identical to the current-interrupting element illustrated in FIG. 16.

FIGS. 23 and 24 are plan views of antenna modules each including a four-by-four antenna array provided with current-interrupting elements. Referring to FIGS. 23 and 24, current-interrupting elements extending along the Y axis are disposed between the antenna elements. FIG. 23 illustrates an example in which the current-interrupting element 150 illustrated in FIG. 11 is arranged in an antenna module 100H. FIG. 24 illustrates an example in which the current-interrupting element 150B illustrated in FIG. 16 is arranged in an antenna module 100J. XPD is regarded as the difference between the peak gain for the main polarization and the peak gain for the cross polarization. Higher values of XPD (in dB) imply that the influence of cross polarization is smaller. A typical target value for XPD is about 20 dB.

Figure 25:
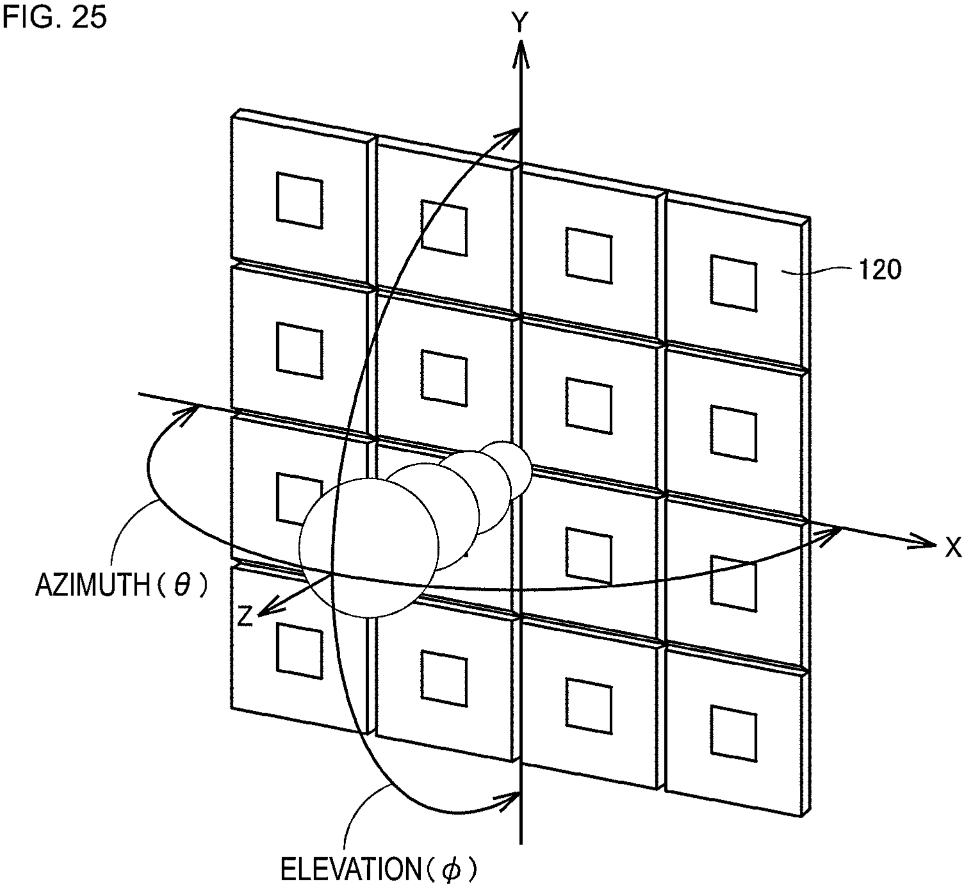
FIG. 25 is provided for the explanation of the direction in which the directivity of an antenna array is tilted.

The following describes, with reference to FIG. 25, the direction in which the directivity of the antenna array is tilted. As described above, the direction in which the beams of radio waves are radiated (i.e., the directivity) may be tilted in accordance with phase shifts in radio-frequency signals fed to the antenna elements. Referring to FIG. 25, in which the X-axis direction and the Y-axis direction, respectively, correspond to the horizontal direction and the vertical direction, θ denotes the beam tilt angle formed between the Z-axis direction and the horizontal direction (azimuth direction), and ϕ denotes the beam tilt angle between the Z-axis direction and the vertical direction (elevation direction).

Figure 26:
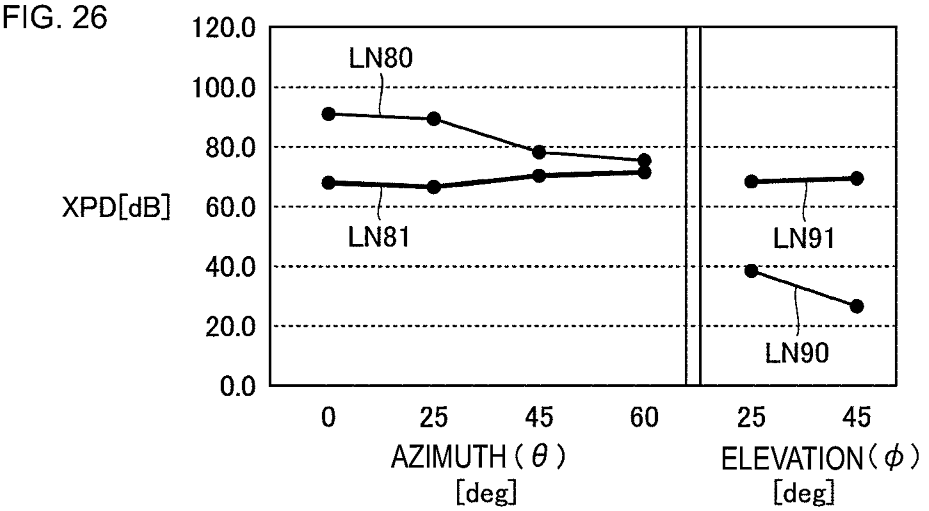
FIG. 26 is provided for the explanation of the XPD of the antenna array illustrated in FIG. 23 and the XPD of the antenna array illustrated in FIG. 24.

FIG. 26 illustrates XPD as determined in the simulation conducted on the antenna array in FIG. 23 and the antenna array in FIG. 24 with beams of varying tilt angles in the azimuth direction and the elevation direction. The XPD as determined with varying azimuth (θ) and fixed elevation angle (ϕ=0°) is plotted on the left side of the graph in FIG. 26. The XPD as determined with varying elevation (ϕ) and fixed azimuth (θ=0°) is plotted on the right side of the graph in FIG. 26. In FIG. 26, lines LN80 and LN90 denote the XPD of the antenna module 100H illustrated in FIG. 23, and lines LN81 and LN91 denote the XPD of the antenna module 100J illustrated in FIG. 24.

Referring to FIG. 26, both the antenna module 100H and the antenna module 100J achieve high levels of XPD, higher than 60 dB, at any angle of tilt in the azimuth direction. The high levels of XPD are presumably due to the current-interrupting elements conducive to reducing the influence of adjacent antenna elements.

As for the tilt in the elevation direction, the recommended level of XPD (20 dB or higher) is achieved by both the antenna module 100H and the antenna module 100J, however, the antenna module 100H (see the line LN90) compares rather unfavorably with the antenna module 100J (see the line LN91) as far as the values of XPD are concerned.

Neither the antenna module 100H nor the antenna module 100J includes a current-interrupting element disposed between antenna elements adjacent to each other in the Y-axis direction. The effect exerted by the current-interrupting elements with the beam tilt in the azimuth direction may be essentially not achievable in the case with the beam tilt in the elevation direction. The antenna module 100J, into the current-interrupting elements 150B are adopted, is superior to the antenna module 100H in point of symmetry of the layout of the current-interrupting elements. The antenna module 100J thus offers a higher degree of symmetry of the current distribution in the ground electrode GND. Consequently, a high level of XPD is achieved in the case with the beam tilt in the elevation direction. The improved layout of the current-interrupting elements enables adjustment of the current distribution in the ground electrode GND such that the XPD of the antenna module as a whole will be improved.

A further improvement in XPD may be achieved through the adoption of the configuration of the antenna module 100C described with reference to FIG. 14, in which another current-interrupting element is disposed between antenna elements adjacent to each other in the Y-axis direction.

The antenna module in FIG. 23 and the antenna module in FIG. 24 are each configured as a four-by-four antenna array mounted on a single dielectric substrate. Alternatively, the four-by-four antenna array may be a combination of four antenna arrays each of which is a two-by-two antenna array.

Figure 27:
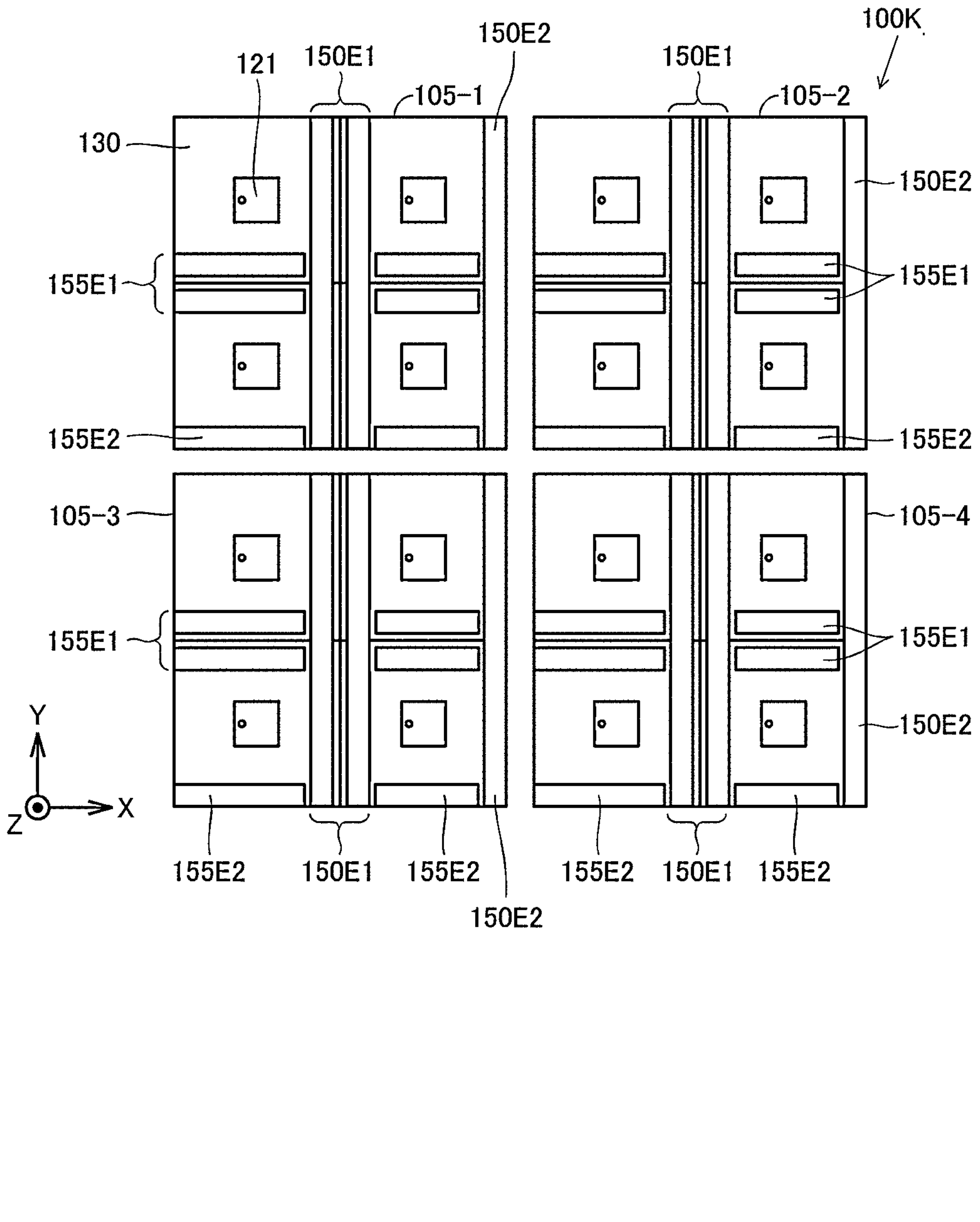
FIG. 27 is a plan view of an antenna module including a four-by-four antenna array composed of two-by-two submodules.

FIG. 27 is a plan view of an antenna module 100K including a four-by-four antenna array composed of two-by-two sub-module arrays. Referring to FIG. 27, the antenna module 100K is configured as a combination of four sub-modules. The sub-modules, respectively, are denoted by 105-1 to 105-4. Clearance is left between two adjacent sub-modules of the antenna module 100K.

The sub-modules are structurally identical to each other. As with the antenna module in FIG. 11 and the antenna module in FIG. 14, each sub-module includes four antenna elements 121 arranged in a two-by-two array and mounted on the dielectric substrate 130 that is substantially square in shape. The sub-modules, which are structurally similar to the antenna module 100C in FIG. 14, each include a current-interrupting element 150E1 and a current-interrupting element 155E1. The current-interrupting element 150E1 is disposed between the antenna elements adjacent to each other in the X-axis direction and extends along the Y axis. The current-interrupting element 155E1 is disposed between the antenna elements adjacent to each other in the Y-axis direction and extends along the X axis.

The current-interrupting elements 150E1 and 155E1 are each composed of two current-interrupting elements that are arranged side by side in a manner so as to extend in the same direction, just as in the antenna module 100D illustrated in FIG. 16. Both of the current-interrupting elements 150E1 and 155E1 may be disposed in such a manner that the open edges (second edge portions) of the planar electrodes face each other or in such a manner that the other edge portions (first edge portions) of the planar electrodes face each other.

The sub-modules each include a current-interrupting element 150E2 and a current-interrupting element 155E2. The current-interrupting element 150E2 is disposed on a side of the dielectric substrate 130 that extends along the Y axis. The current-interrupting element 155E2 is disposed on a side of the dielectric substrate 130 that extends along the X axis. Unlike the current-interrupting element 150E1 and 155E1, the current-interrupting elements 150E2 and 155E2 are each configured as a single current-interrupting element. The clearance between two adjacent sub-modules offers a certain degree of improvement in the isolation between the sub-modules. With the adjacent sub-modules being arranged as above, a current-interrupting element is disposed on only one of their respective sides arranged face to face. This layout ensures a sufficient degree of isolation.

It is not required that the sub-modules 105-3 and 105-4 include the current-interrupting elements 150E2 on their respective sides extending along the X axis and facing none of the sub-modules. Similarly, it is not required that the sub-modules 105-2 and 105-4 include the current-interrupting elements 155E2 on their respective sides extending along the Y axis and facing none of the sub-modules. Nevertheless, the aforementioned example, in which all of the sub-modules are structurally identical to each other, has an advantage in its suitability for providing a large antenna array made up of homogeneous sub-modules. Such a large antenna array may, for example, be a six-by-six antenna array made up of nine homogeneous sub-modules or an eight-by-eight antenna array made up of sixteen homogeneous sub-modules.

Embodiment 3

The current-interrupting elements in Embodiments 1 and 2 are provided to the ground electrode of the antenna module in which the antenna elements are disposed.

Factors other than the antenna module can exert an influence upon the directivity of the antenna module. The antenna module in finished form is mounted on a mounting substrate including a ground electrode, with the ground electrode of the antenna module being connected to the ground electrode of the mounting substrate. The directivity of the antenna module can thus vary in relation to the current distribution in the ground electrode of the mounting substrate.

This point is taken into consideration in Embodiment 3, in which current-interrupting elements are provided to a ground electrode of a mounting substrate, as will be described below, for the purpose of adjusting the directivity of an antenna module mounted on the mounting substrate.

Figure 28:
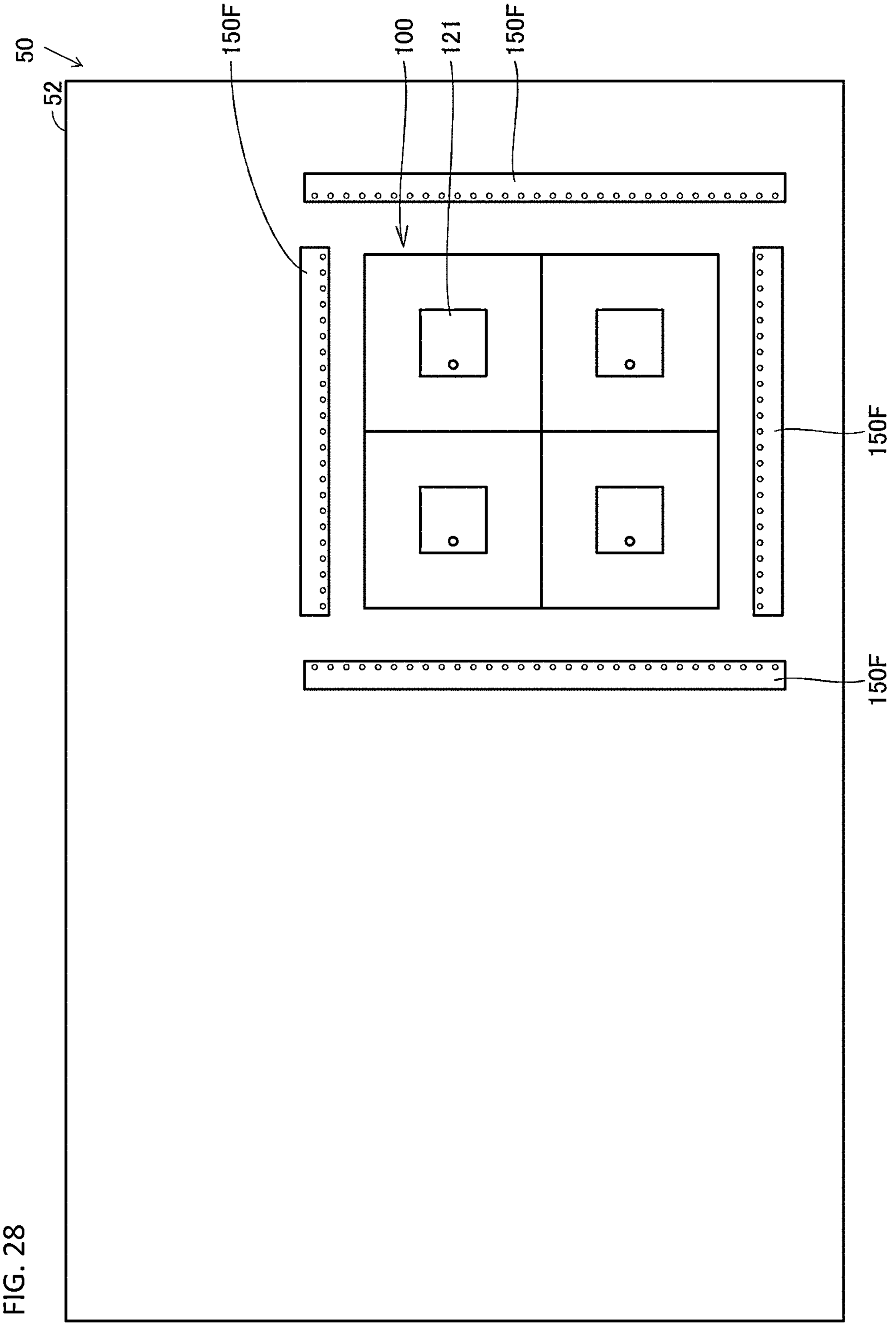
FIG. 28 is provided for the explanation of a communication module according to Embodiment 3.

FIG. 28 is provided for the explanation of a communication module 50 according to Embodiment 3. The communication module 50 includes the antenna module 100, a mounting substrate 52, and current-interrupting elements 150F. The antenna module 100 is mounted on the mounting substrate 52 and is enclosed with the current-interrupting elements 150F. The BBIC 200 described with reference to FIG. 1 and circuits functionally different from the BBIC 200 are formed or mounted on the mounting substrate 52.

Under the constraint that many devices and circuits are formed on the mounting substrate, the antenna module is not necessarily located on the central part of the mounting substrate. Since different devices and different circuits on the mounting substrate consume different amounts of power, the current distribution in the ground electrode of the mounting substrate is not necessarily uniform across the mounting substrate. The current distribution in the ground electrode of the mounting substrate can thus vary in relation to, for example, the position of the antenna module on the mounting substrate and operating conditions of the other devices on the mounting substrate. Along with the current distribution in the ground electrode of the mounting substrate, the current distribution in the ground electrode of the antenna module undergo changes, which in turn would have an impact on the directivity of the antenna module.

The antenna module 100 of the communication module 50 in Embodiment 3 is surrounded with the current-interrupting elements 150F. This layout enables the ground electrode of the mounting substrate 52 to eliminate or reduce the possibility of occurrence of leakage of current from the region where the antenna module 100 is enclosed with the current-interrupting elements 150F as well as the possibility of occurrence of entry of current into the region from the outside of the current-interrupting elements 150F.

Referring to FIG. 28, the antenna module 100 is disposed on an edge portion of the mounting substrate 52. The current distribution in the ground electrode is likely to become unstable in such an edge portion. However, the layout above (the antenna module 100 enclosed with the current-interrupting elements 150F) gives stability to the current distribution in the mounting place for the antenna module 100 (the region where the antenna module 100 is enclosed with the current-interrupting elements 150F). The layout is thus conducive to reducing the potential impact on the directivity of the antenna module, and the antenna characteristics may be improved accordingly.

The modifications of Embodiment 1 and the modifications of Embodiment 2 may, as appropriate, be adopted into the current-interrupting elements in Embodiment 3 in a way that involves no inconsistency.

Embodiment 4

The following describes Embodiment 4, in which the current-interrupting elements disclosed herein is adopted into a dual-band antenna module designed for the radiation of radio waves in two different frequency bands.

Figure 29:
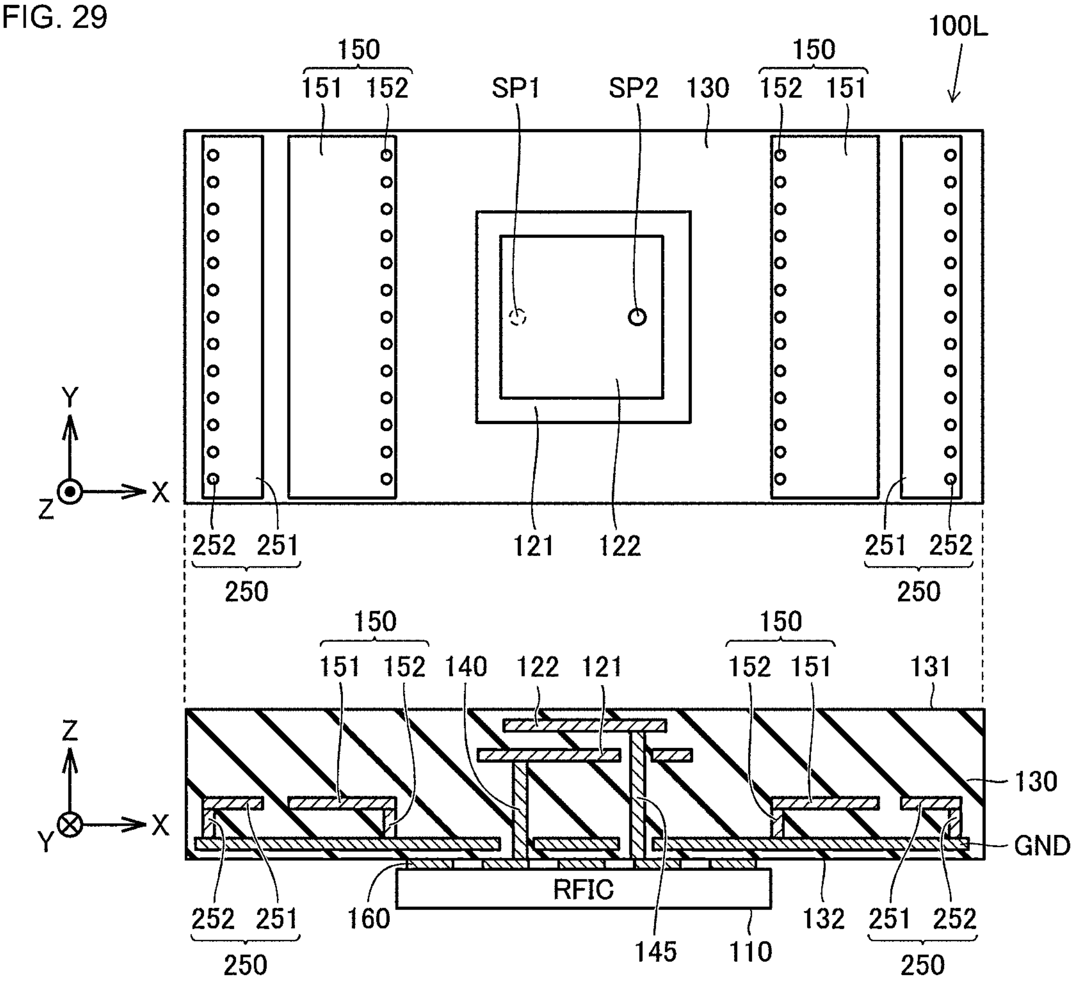
FIG. 29 includes a plan view and a sectional view of an antenna module according to Embodiment 4.

FIG. 29 includes a plan view (in the upper section) and a sectional view (in the lower section) of an antenna module 100L according to Embodiment 4. Referring to FIG. 29, the antenna module 100L includes an antenna element 122, a feed line 145, and a current-interrupting element 250, in addition to the constituent elements of the antenna module 100 according to Embodiment 1 illustrated in FIG. 2. Radio-frequency signals are fed into the antenna element 122 through the feed line 145.

As with the antenna element 121, the antenna element 122 is a patch antenna in the form of a flat plate that is substantially square in shape. The antenna element 122 is disposed in an inner layer of the dielectric substrate 130 or on the top surface 131 on the upper side (i.e., in an upper surface layer). The antenna element 121 is disposed in a layer between the antenna element 122 and the ground electrode GND. When viewed in plan in the direction normal to the dielectric substrate 130, the antenna elements 121 and 122 overlap each other.

Radio-frequency signals from the RFIC 110 are transmitted to the antenna element 122 through the feed line 145. The feed line 145 extends from the solder bump 160 connected to the RFIC 110. The feed line 145 extends through the ground electrode GND and the antenna element 121 and is connected to a feed point SP2 of the antenna element 122. The feed point SP2 of the antenna element 122 is off-center, or more specifically, is shifted out of the center of the antenna element 122 to the positive side in the X-axis direction. Radio-frequency signals fed into the feed point SP2 cause the antenna element 122 to radiate the radio waves polarized in the X-axis direction.

As illustrated in FIG. 29, the antenna element 122 is smaller than the antenna element 121. The resonant frequency of the antenna element 122 is higher than the resonant frequency of the antenna element 121. The frequency band in which the radio waves radiated from the antenna element 122 lie is higher than the frequency band in which the radio waves radiated from the antenna element 121 lie. For example, radio waves in 28 GHz band are radiated from the antenna element 121, and radio waves in 39 GHz band are radiated from the antenna element 122.

The current-interrupting elements 250, respectively, are disposed on the positive side and the negative side in the X-axis direction in a manner so as to be discretely located away from the antenna element 122 and extend in the Y-axis direction. In the example illustrated in FIG. 29, each of the current-interrupting elements 250 is closer to the edge of the dielectric substrate 130 than the corresponding one of the current-interrupting elements 150. When the antenna module 100L is viewed in plan, each of the current-interrupting elements 150 is disposed between the corresponding one of the current-interrupting elements 250 and the antenna elements 121 and 122.

As with the current-interrupting elements 150, the current-interrupting elements 250 each include a planar electrode and vias. The planar electrode, which is denoted by 251, is parallel to the ground electrode GND and is rectangular in shape. The vias are denoted by 252. Each of the current-interrupting elements 250, or more specifically, one of the long sides (first edge portion) of the planar electrode 251 is connected to the ground electrode GND through the vias 252. The other long side (second edge portion) of each of the planar electrodes 251 is left open. The current-interrupting elements 250 are substantially L-shaped when viewed in section along a plane lying parallel to the X axis and passing through one of the vias 252.

The current-interrupting elements 150 are each disposed in such a manner that the open edge portion (second edge portion) of the planar electrode 251 faces the open edge portion (second edge portion) of the planar electrode 151.

The dimension of each of the planar electrodes 251 in the X-axis direction is about one quarter-wavelength; that is, each of the short sides of the planar electrode 251 is about one quarter the wavelength of the radio waves radiated from the antenna element 122. As mentioned above, the frequency band in which the radio waves radiated from the antenna element 122 lie is higher than the frequency band in which the radio waves radiated from the antenna element 121 lie. In other words, the wavelength of the radio waves radiated from the antenna element 122 is shorter than the wavelength of the radio waves radiated from the antenna element 121. For this reason, the dimension of the planar electrodes 251 in the X-axis direction is less than the dimension of the planar electrodes 151 in the X-axis direction.

As described above, such a dual-band stacked antenna module includes antenna elements of different sizes. The antenna elements are disposed in manner so as to face each other in the stacking direction of a dielectric substrate. For the purpose of changing the distribution of the current flowing through a ground electrode, different current-interrupting elements are provided for different frequency bands in which the radio waves radiated from the antenna elements lie. In this way, the antenna characteristics are adjusted on an individual band basis.

MODIFICATIONS

The dual-band stacked antenna module according to Embodiment 4 is designed for the radiation of radio waves with the same polarization direction from both of the antenna elements provided for the respective frequency ranges, one of which is higher than the other.

The following describes a modification of Embodiment 4, in which the polarization direction of the radio waves radiated from one antenna element is different from the polarization direction of the radio waves radiated from the other antenna element. The antenna elements are provided for the respective frequency ranges, one of which is higher than the other.

Figure 30:
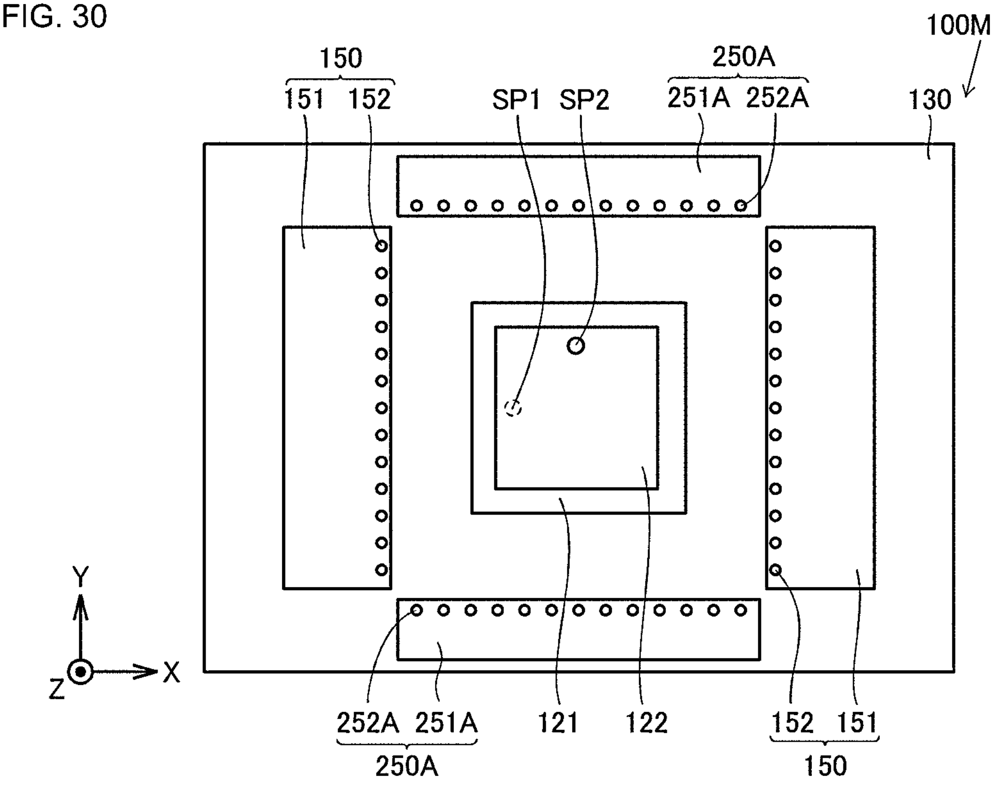
FIG. 30 is a plan view of an antenna module according to a modification of Embodiment 4.

FIG. 30 is a plan view of an antenna module 100M according to a modification of Embodiment 4. Referring to FIG. 30, the antenna module 100M includes the antenna elements 121 and 122. As in the antenna module 100L in FIG. 29, the antenna elements 121 and 122 are disposed in a manner so as to face each other in the stacking direction. The antenna module 100M is thus regarded as a dual-band stacked antenna module.

The feed points of the antenna elements of the antenna module 100M are off-center. More specifically, the feed point SP1 of the antenna element 121 for the lower frequency range is shifted out of the center of the antenna element 121 to the negative side in the X-axis direction, and the feed point SP2 of the antenna element 122 for the higher frequency range is shifted out of the center of the antenna element 122 to the positive side in the Y-axis direction. The radio waves polarized in the X-axis direction are radiated from the antenna element 121, and the radio waves polarized in the Y-axis direction are radiated from the antenna element 122.

For the purpose of enabling the antenna module 100M to adjust its characteristics for the radio waves radiated from the antenna element 122, current-interrupting elements 250A, respectively, are disposed on the positive side and the negative side in the Y-axis direction in a manner so as to be discretely located away from the antenna element 122 and extend in the X-axis direction. That is, the current-interrupting elements 250A are disposed in a manner so as to extend in the direction orthogonal to the polarization direction of the radio waves radiated from the antenna element 122.

As with the current-interrupting elements 150, the current-interrupting elements 250A each include a planar electrode and vias. The planar electrode, which is denoted by 251A, is parallel to the ground electrode GND and is rectangular in shape. The vias are denoted by 252A. Each of the current-interrupting elements 250A, or more specifically, one of the long sides (first edge portion) of each of the planar electrodes 251A is connected to the ground electrode GND through the vias 252A. The other long side (second edge portion) of each of the planar electrodes 251A is left open. The current-interrupting elements 250A are substantially L-shaped when viewed in section along a plane lying parallel to the Y axis and passing through one of the vias 252A.

The dimension of each of the planar electrodes 251A in the Y-axis direction is about one quarter-wavelength; that is, each of the short sides of the planar electrode 251A is about one quarter the wavelength of the radio waves radiated from the antenna element 122. As mentioned above, the frequency band in which the radio waves radiated from the antenna element 122 lie is higher than the frequency band in which radio waves from the antenna element 121 lie. In other words, the wavelength of the radio waves radiated from the antenna element 122 is shorter than the wavelength of the radio waves radiated from the antenna element 121. For this reason, the dimension of the planar electrodes 251A in the Y-axis direction is less than the dimension of the planar electrodes 151 in the Y-axis direction.

As described above, different current-interrupting elements for different frequency bands may be included in such a dual-band stacked antenna module in which the polarization direction of radio waves in a higher frequency band is different from the polarization direction of radio waves in a lower frequency band. Each of the current-interrupting elements is disposed in a manner so as to extend in the direction orthogonal to the polarization direction of the corresponding radio waves. In this way, the antenna characteristics are adjusted on an individual band basis.

The configurations for dual-band application in FIGS. 29 and 30 may be adopted into the antenna array described in Embodiment 2. The modifications of Embodiment 1 and the modifications of Embodiment 2 may, as appropriate, be adopted into the current-interrupting elements in Embodiment 4 and the current-interrupting elements in the modification of Embodiment 4 in a way that involves no inconsistency.

Although the current-interrupting elements in the embodiments above are provided to the ground electrode for the purpose of adjusting the directivity of the antenna module, such a current-interrupting element may be included in radio-frequency devices other than antenna modules. For example, each current-interrupting element may be provided to a ground electrode between two filter devices for the purpose of improving the isolation between filters, or each current-interrupting element may be provided to a ground electrode between two radio-frequency modules for the purpose of improving the isolation between the radio-frequency modules.

It should be understood that the embodiments disclosed herein are in all aspects illustrative and not restrictive. The scope of the present disclosure is defined by the claims rather than by the description of the embodiments above, and all changes that fall within metes and bounds of the claims, or equivalence of such metes and bounds thereof, are therefore intended to be embraced by the claims.

10 communication device
50 communication module
52 mounting substrate
100, 100A to 100H, 100J to 100M antenna module
105 sub-module
110 RFIC
111A to 111D, 113A to 113D, 117 switch
112AR to 112DR low-noise amplifier
112AT to 112DT power amplifier
114A to 114D attenuator
115A to 115D phase shifter
116 signal combiner/splitter
118 mixer
119 amplifier circuit
120 antenna unit
121, 122, P1 to P4, P1A, P2A antenna element
130 dielectric substrate
131 top surface
132 bottom surface
140, 145 feed line
150, 150A to 150F, 155, 155A, 155E, 250, 250A current-interrupting element
151, 151A, 151B, 153, 251, 251A planar electrode
152, 170 to 172, 252, 252A via
160 solder bump
175 slit
200 BBIC
Cpr parasitic capacitance
GND, GND1, GND2 ground electrode
RG1 to RG5, RG10, RG11 region
SP1, SP2 feed point

The invention claimed is:

1. An antenna module comprising:
a dielectric substrate having a multilayer structure;
a first radiation electrode in a first layer of the dielectric substrate, the first radiation electrode being configured to radiate a radio-frequency signal;
a ground electrode in a second layer of the dielectric substrate; and
at least one current-interrupting circuit element that is electrically connected to the ground electrode and that is configured to interrupt a current flowing through the ground electrode, wherein:
the at least one current-interrupting circuit element comprises a planar electrode that is parallel to the ground electrode and that has a first edge that is electrically connected to the ground electrode and a second edge that is electrically open, and
a dimension of the at least one current-interrupting circuit element in a direction from the first edge to the second edge is λ/4, where λ is a wavelength of the radio-frequency signal radiated from the first radiation electrode.

2. The antenna module according to claim 1, wherein:
the planar electrode is a rectangular shape, the first and second edges of the planar electrode corresponding to short sides of the rectangular shape, and
a length of each long side of the planar electrode is greater than λ/2.

3. The antenna module according to claim 2, wherein when viewed in a plan view in a direction normal to the dielectric substrate, the long sides of the planar electrode extend in a direction orthogonal to a direction in which the radio-frequency signal radiated from the first radiation electrode is polarized.

4. The antenna module according to claim 3, wherein when viewed in the plan view, the first radiation electrode and the planar electrode are adjacent in the direction in which the radio-frequency signal radiated from the first radiation electrode is polarized.

5. The antenna module according to claim 1, further comprising a second radiation electrode in a layer of the dielectric substrate,
wherein the at least one current-interrupting circuit element is between the first radiation electrode and the second radiation electrode.

6. The antenna module according to claim 5, wherein:
the at least one current-interrupting circuit element comprises a first current-interrupting circuit element and a second current-interrupting circuit element, and
the first and second current-interrupting circuit elements are between the first and second radiation electrodes such that the edge of the first current-interrupting circuit element and the second edge of the second current-interrupting circuit element face each other.

7. The antenna module according to claim 6, wherein part of the second edge of the first current-interrupting circuit element and part of the second edge of the second current-interrupting circuit element are electrically connected to each other.

8. The antenna module according to claim 6, wherein the second edge of the first current-interrupting circuit element and the second edge of the second current-interrupting circuit element are each comb teeth-shaped.

9. The antenna module according to claim 5, wherein:
the at least one current-interrupting circuit element comprises a first current-interrupting circuit element and a second current-interrupting circuit element, and when the antenna module is viewed in a plan view in a direction normal to the dielectric substrate:

the second edge of the first current-interrupting circuit element faces the second radiation electrode, the second edge of the second current-interrupting circuit element faces the first radiation electrode, and with a side of the first radiation electrode and a side of the second radiation electrode facing each other, the first and second current-interrupting circuit elements are alternately disposed.

10. The antenna module according to claim 1, further comprising:

a second radiation electrode adjacent to the first radiation electrode in a first direction; and a third radiation electrode adjacent to the first radiation electrode in a second direction that is orthogonal to the first direction, wherein:

the at least one current-interrupting circuit element comprises a first current-interrupting circuit element and a second current-interrupting circuit element, the first current-interrupting circuit element is between the first radiation electrode and the second radiation electrode, and the second current-interrupting circuit element is between the first radiation electrode and the third radiation electrode.

11. A communication device comprising the antenna module according to claim 1.

12. A communication module comprising:

an antenna module comprising a radiation electrode;

a mounting substrate comprising a ground electrode, the antenna module being mounted on the mounting substrate; and at least one current-interrupting circuit element on the mounting substrate, the antenna module being surrounded by the at least one current-interrupting circuit element, wherein:

the at least one current-interrupting circuit element comprises a planar electrode that is parallel to the ground electrode and that has a first edge that is electrically connected to the ground electrode and a second edge that is electrically open, and a dimension of the at least one current-interrupting circuit element in a direction from the first edge to the second edge is λ/4, where λ is a wavelength of a radio-frequency signal radiated from the radiation electrode.

* * * * *